US010205686B2

(12) United States Patent
Horiuchi et al.

(10) Patent No.: US 10,205,686 B2
(45) Date of Patent: Feb. 12, 2019

(54) COMMUNICATION TERMINAL, COMMUNICATION SYSTEM, AND OUTPUT METHOD

(71) Applicants: Takeshi Horiuchi, Tokyo (JP); Naoki Umehara, Kanagawa (JP); Hiroshi Hinohara, Kanagara (JP); Atsushi Miyamoto, Kanagawa (JP); Takuya Soneda, Kanagawa (JP)

(72) Inventors: Takeshi Horiuchi, Tokyo (JP); Naoki Umehara, Kanagawa (JP); Hiroshi Hinohara, Kanagara (JP); Atsushi Miyamoto, Kanagawa (JP); Takuya Soneda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 180 days.

(21) Appl. No.: 15/272,901

(22) Filed: Sep. 22, 2016

(65) Prior Publication Data

US 2017/0093762 A1 Mar. 30, 2017

(30) Foreign Application Priority Data

Sep. 30, 2015 (JP) ................................. 2015-193617
Mar. 4, 2016 (JP) ................................. 2016-042073

(51) Int. Cl.
*G06F 15/173* (2006.01)
*G06F 15/177* (2006.01)
(Continued)

(52) U.S. Cl.
CPC ............ *H04L 51/04* (2013.01); *H04L 51/043* (2013.01); *H04L 63/0876* (2013.01); *H04L 65/1046* (2013.01); *H04L 65/1059* (2013.01)

(58) Field of Classification Search
CPC .................................................... H04L 51/04
(Continued)

(56) References Cited

U.S. PATENT DOCUMENTS 9,838,240 B1 * 12/2017 Cormie ............ H04L 29/08135
2005/0089023 A1 * 4/2005 Barkley ................. H04L 29/06
370/352

(Continued)

FOREIGN PATENT DOCUMENTS

JP 2006-174193 6/2006
WO WO 2007/121783 A1 11/2007

OTHER PUBLICATIONS

Extended European Search Report dated Feb. 22, 2017 in Patent Application No. 16189146.0.

*Primary Examiner* — Karen C Tang
(74) *Attorney, Agent, or Firm* — Oblon, McClelland, Maier & Neustadt, L.L.P.

(57) ABSTRACT

A communication terminal, a communication system and an output method. The communication terminal and the output method include storing, in a memory, a plurality of communication applications including a first communication application and a second communication application, outputting first status information indicating a first status of the first communication application according to a call control information transmitted by the first communication application, and outputting second status information indicating a second status of the second communication application according to a resource that is used by the first communication application in the first status. The communication system includes a publish-subscribe server and the communication terminal, and the communication terminal further includes sending a pub request to publish the call control information and a sub request to subscribe to the call control information to the publish-subscribe server.

11 Claims, 19 Drawing Sheets

(51) Int. Cl.
*H04L 12/58* (2006.01)
*H04L 29/06* (2006.01)

(58) Field of Classification Search
USPC .................................................. 709/224, 223
See application file for complete search history.

(56) References Cited

U.S. PATENT DOCUMENTS

| | | |
|---|---|---|
| 2005/0210113 A1 | 9/2005 | Kasuga et al. |
| 2007/0094304 A1* | 4/2007 | Horner ................... G06Q 10/10 |
| 2007/0156842 A1* | 7/2007 | Vermeulen ........ G06F 17/30212 |
| | | 709/217 |
| 2007/0189301 A1 | 8/2007 | Kiss et al. |
| 2007/0192325 A1* | 8/2007 | Morris ................... H04L 67/24 |
| 2007/0233875 A1 | 10/2007 | Raghav et al. |
| 2013/0072153 A1* | 3/2013 | Lawson ................. H04L 63/10 |
| | | 455/410 |
| 2014/0115068 A1* | 4/2014 | Kurupacheril ...... H04L 12/1813 |
| | | 709/206 |
| 2016/0277329 A1* | 9/2016 | Gordon ................ H04L 51/046 |

* cited by examiner

FIG. 6A

| USER ID | USER NAME | PASSWORD |
|---|---|---|
| U01 | a | abc |
| U02 | b | def |
| U03 | c | ghi |
| ... | ... | ... |

FIG. 6B

| CLIENT ID | CLIENT NAME | PASSWORD |
|---|---|---|
| C01 | VIDEO COMMUNICATION APPLICATION A | aaaa |
| C02 | VIDEO COMMUNICATION APPLICATION B | bbbb |
| C03 | RELAY DEVICE MANAGEMENT APPLICATION | cccc |
| C04 | INTEGRATED COMMUNICATION CLIENT | dddd |
| ... | ... | ... |

FIG. 6C

| SERVICE ID | SERVICE NAME |
|---|---|
| S01 | TRANSMISSION MANAGEMENT SYSTEM |
| ... | ... |

FIG. 6D

| TOPIC NAME | CLIENT ID | USER ID |
|---|---|---|
| ConfRoom1 | C01 | U01 |
| ConfRoom1 | C01 | U02 |
| ConfRoom2 | C02 | U01 |
| ConfRoom2 | C02 | U03 |
| ConfRoom2 | C03 | U04 |
| Client1/Presence | C04 | U02 |
| Client1/Presence | C04 | U03 |
| ... | ... | ... |

FIG. 8A

| CONFERENCE ROOM ID | TOPIC NAME |
|---|---|
| RoomA | ConfRoom2 |
| RoomB | — |
| ... | ... |

FIG. 8B

| CLIENT ID | USER ID |
|---|---|
| C02 | U01 |
| C02 | U03 |
| ... | ... |

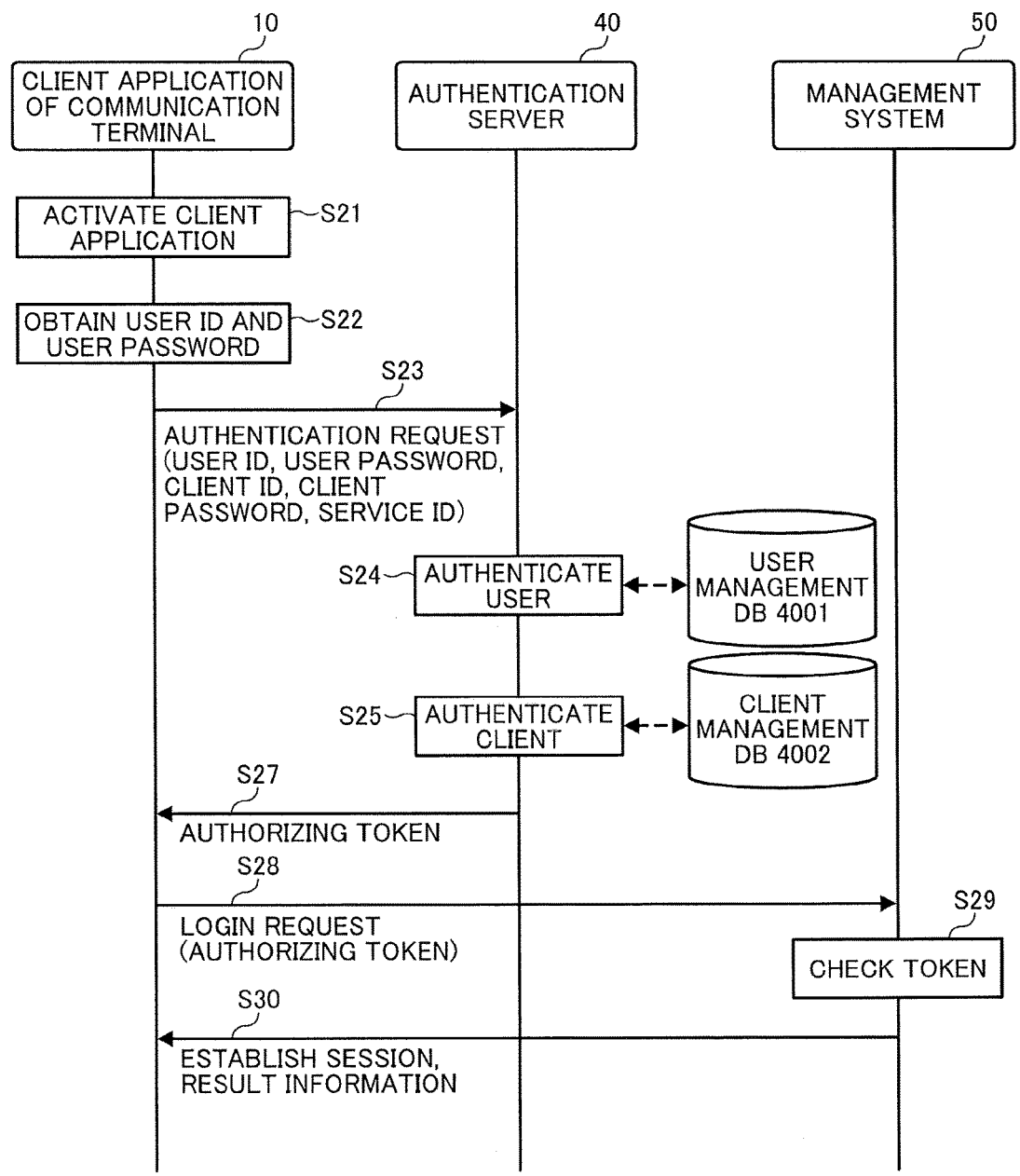

COMMUNICATION TERMINAL, COMMUNICATION SYSTEM, AND OUTPUT METHOD

CROSS-REFERENCE TO RELATED APPLICATIONS

This patent application is based on and claims priority pursuant to 35 U.S.C. § 119(a) to Japanese Patent Application Nos. 2015-193617 and 2016-042073, filed on Sep. 30, 2015, and Mar. 4, 2016, respectively, in the Japan Patent Office, the entire disclosures of which is are hereby incorporated by reference herein.

BACKGROUND

Technical Field

Embodiments of the present invention relate to a communication terminal, a communication system, and an output method.

Background Art

In recent years, communication systems for performing phone conversation or video conference through the communication network such as the Internet or private lines are widely used due to increasing demands for reduction in cost and time. When communication among a plurality of communication terminals is started, such communication systems exchange contents of data such as image data and audio data with each other. Accordingly, the communication among the participants who use the communication terminals is realized.

For example, an integrated presence management system is known that includes a communication terminal with a memory or the like in which a plurality of application client programs are stored and a presence server with a memory or the like in which presence information of the communication terminal is stored. When a request to register the presence information of one of the multiple applications of the above communication terminal is received from the communication terminal, the presence server synchronizes the presence information of at least one another application of the above communication terminal, which belongs to the same group as the one of the multiple application of the above communication terminal, with the one of the multiple application of the above communication terminal.

SUMMARY

Embodiments of the present invention described herein provide a communication terminal, a communication system and an output method. The communication terminal and the output method include storing, in a memory, a plurality of communication applications including a first communication application and a second communication application, outputting first status information indicating a first status of the first communication application according to a call control information transmitted by the first communication application, and outputting second status information indicating a second status of the second communication application according to a resource that is used by the first communication application in the first status. The communication system includes a publish-subscribe server and the communication terminal, and circuitry of the communication terminal sends, for each of the plurality of communication applications, a pub request to publish the call control information and a sub request to subscribe to the call control information to the publish-subscribe server.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 6A to FIG. 6D are diagrams each illustrating an example data structure of a management table, according to an embodiment of the present invention.

FIG. 8A and FIG. 8B are diagrams each illustrating an example data structure of a management table, according to an embodiment of the present invention.

FIG. 9 is a sequence diagram illustrating authentication processes according to an embodiment of the present invention.

Figure 1:
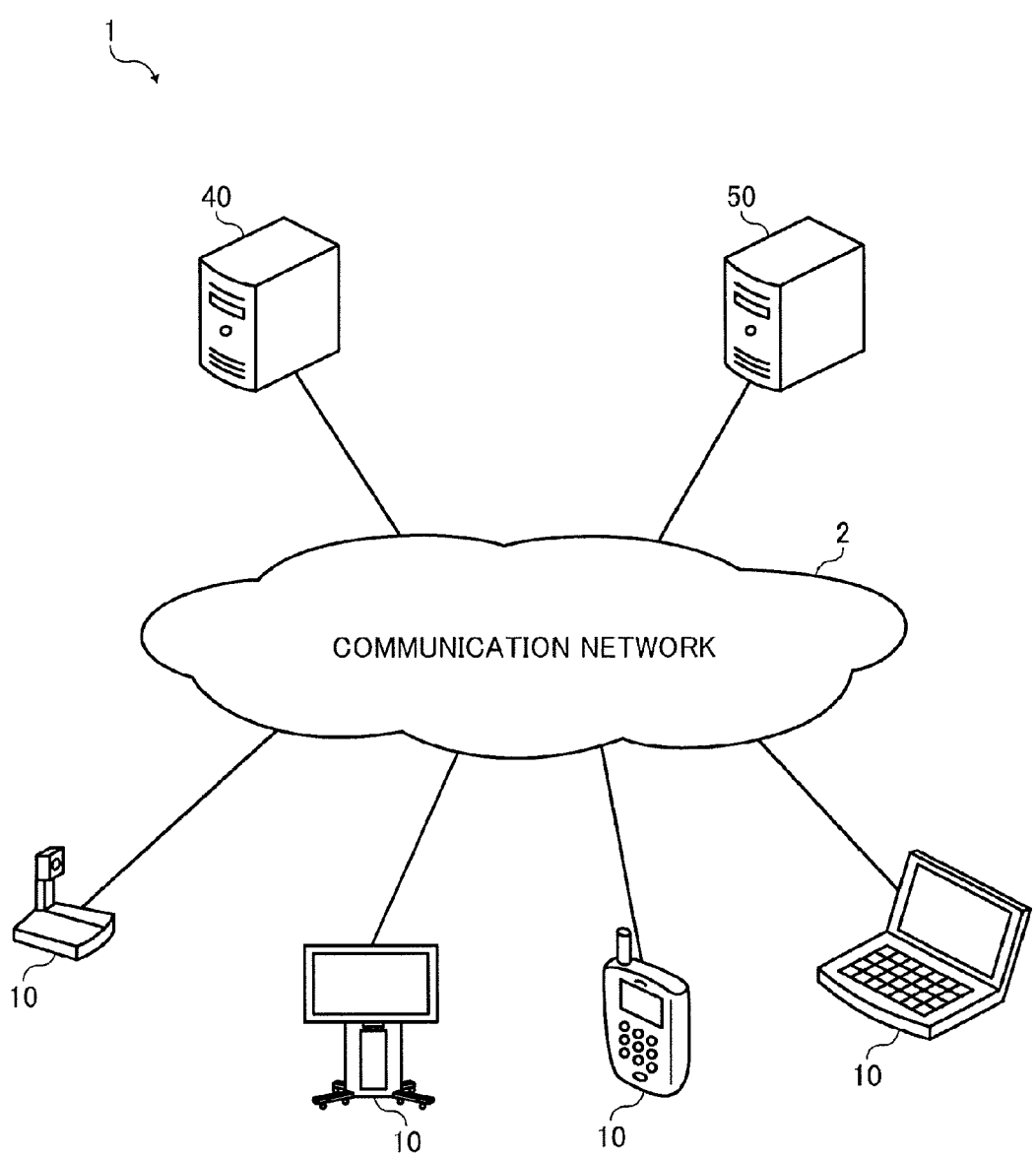
FIG. 1 is a schematic diagram illustrating a configuration of a communication system according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, an embodiment of the present invention is described with reference to the drawings.

<<Schematic Configuration of Communication System>>

FIG. 1 is a schematic diagram illustrating a configuration of a communication system according to the present embodiment.

As illustrated in FIG. 1, the communication system 1 includes a communication terminal 10, an authentication server 40, and a management system 50. Hereinafter, the communication terminal 10 may be referred to simply as the terminal 10.

The management system 50 is a server that receives a message publication request and a message subscription request from clients in the publish-subscribe model. Such message publication requests and message subscription requests are used to exchange messages among clients. The publish-subscribe model may be referred to simply as a pub/sub model, and publication and subscription may be referred to simply as pub and sub, respectively. As a protocol compatible with the pub/sub model, for example, the management system 50 may be provided with a pub/sub extension (XEP-0060) of Message Queue Telemetry Transport (MQTT) or Extensible Messaging and Presence Protocol (XMPP).

The communication terminal 10 may be, for example, a general-purpose communication terminal, and may be installed with a desired client application. Alternatively, the communication terminal 10 may be, for example, a communication terminal that is designed for exclusive use, and may be installed with a specific client application that serves as a client. The communication terminal 10 is connected to the management system 50 through a communication network 2. Accordingly, the clients of the communication terminal 10 can request message pub and message sub from the management system 50. The communication terminal 10 may be, for example, a television conference terminal, an electronic whiteboard, a digital signage, a telephone, a tablet personal computer (PC), a smartphone, a camera, and a PC.

The authentication server 40 is a server that authenticates a client, which is a client application operating on the communication terminal 10, and a user who uses that client, respectively, to authorize the use of the management system 50. In order to implement such authentication and authorization as above, the management system 50 is provided with an authenticating or authorizing protocol such as OAuth 2.0 or OpenID Connect.

For the purpose of simplification, cases in which each of the management system 50 and the authentication server 40 is a single device are described as above with reference to FIG. 1. However, no limitation is intended by such an embodiment. At least one of the management system 50 and the authentication server 40 may include a plurality of devices. Alternatively, the management system 50 and the authentication server 40 may be implemented by a single system or device. Moreover, for the purpose of simplification, cases in which the communication system 1 includes the four communication terminals 10 are described as above with reference to FIG. 1. However, no limitation is intended by such an embodiment. The number of the communication terminals 10 that are provided for the communication system 1 may be two, three, or five or more. The types of the communication terminals 10 may be similar to each other, or may be different from each other as illustrated in FIG. 1.

<<Hardware Configuration>>

Next, the hardware configuration of each element of the communication system 1 is described.

Figure 2:
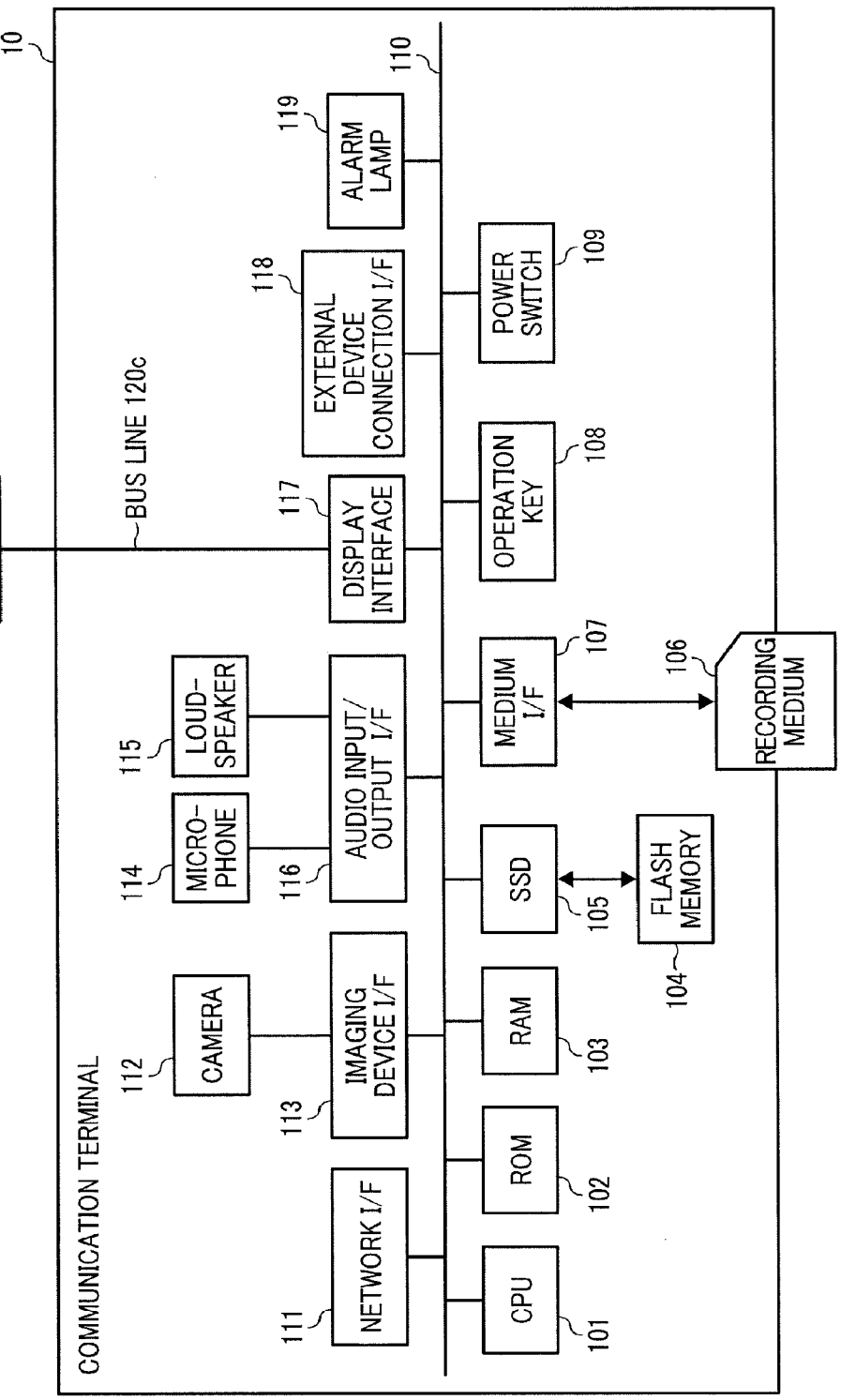
FIG. 2 is a schematic block diagram illustrating a hardware configuration of a communication terminal according to an embodiment of the present invention.

FIG. 2 is a schematic block diagram illustrating the hardware configuration of the communication terminal 10 according to the present embodiment.

The hardware configuration of the communication terminal 10 is not limited to the hardware configuration illustrated in FIG. 2 as long as the communication terminal 10 is capable of performing communication. For example, the communication terminal 10 may include an additional element that is not illustrated in FIG. 2. Alternatively, some of the elements illustrated in FIG. 2 may be omitted. Moreover, some of the elements illustrated in FIG. 2 may be, for example, an external device that can be coupled to the communication terminal 10. As illustrated in FIG. 2, the communication terminal 10 according to the present embodiment includes a central processing unit (CPU) 101 that controls the overall operation of the communication terminal 10, a read-only memory (ROM) 102 that stores a control program used for operating the CPU 101 such as an initial program loader (IPL), a random access memory (RAM) 103 is mainly used as a work area in which the CPU 101 executes a program, a flash memory 104 that stores various kinds of data such as a communication control program for the communication terminal 10, image data, and audio data, a solid state disk (SSD) 105 that controls reading or writing of various kinds of data to or from the flash memory 104 under the control of the CPU 101, a medium interface (I/F) 107 that controls reading or writing of data with respect to a recording medium 106 such as a flash memory and an integrated circuit (IC) card, an operation key 108 that is operated by a user to input a user instruction such as a user selection of a destination of the communication from the communication terminal 10, a power switch 109 that turns on or turns off the power of the communication terminal 10, and a network interface (I/F) 111 that transmits data using the communication network 2.

Moreover, the communication terminal 10 includes a built-in camera 112 that captures a subject under the control of the CPU 101 to obtain the image data of the subject, an imaging device interface (I/F) 113 that controls the operation of the camera 112, a built-in microphone 114 that receives sound, a built-in loudspeaker 115 that outputs sound, an audio input and output (input/output) interface (I/F) 116 that controls the input and output of an audio signal between the microphone 114 and the loudspeaker 115 under the control of the CPU 101, a display interface 117 that transmits the image data to an external display 120 under the control of the CPU 101, an external device connection interface (I/F) 118 that connects the communication terminal 10 to various kinds of external devices, an alarm lamp 119 that provides notification of various kinds of functional abnormalities detected in the communication terminal 10, and a bus line 110 such as an address bus or a data bus that electrically connects various elements as above to each other as illustrated in FIG. 2.

The display 120 may be a liquid crystal or organic electroluminescence (EL) display that displays an image of a subject, an operation icon, or the like. The display 120 is connected to the display interface (I/F) 117 via a cable 120c. The cable 120c may be an analog red green blue (RGB) (video graphic array (VGA)) signal cable, a component video cable, a high-definition multimedia interface (HDMI, registered trademark) signal cable, or a digital video interactive (DVI) signal cable.

The camera 112 includes a lens and a solid-state image sensing device that converts an image (video) of a subject into electronic data by converting light to electric charge. As the solid-state image sensing device, for example, a complementary metal-oxide-semiconductor (CMOS) or a charge-coupled device (CCD) is used.

To the external device connection interface 118, an external device such as an external camera, an external microphone, and an external loudspeaker can be electrically connected, through a Universal Serial Bus (USB) cable or the like that is inserted into a connection port of the housing of the communication terminal 10. In cases where an external camera is connected, the external camera is driven on a priority basis and the built-in camera 112 is not driven under the control of the CPU 101. In a similar manner to the above, in the case where an external microphone is connected or an external loudspeaker is connected, the external microphone or the external loudspeaker is driven under the control of the CPU 101 on a top-priority basis over the built-in microphone 114 or the built-in loudspeaker 115.

The recording medium 106 is removable from the communication terminal 10. In addition, a nonvolatile memory that reads or writes data under the control of the CPU 101 is not limited to the flash memory 104, and an electrically erasable and programmable read-only memory (EEPROM) may be used instead.

Figure 3:
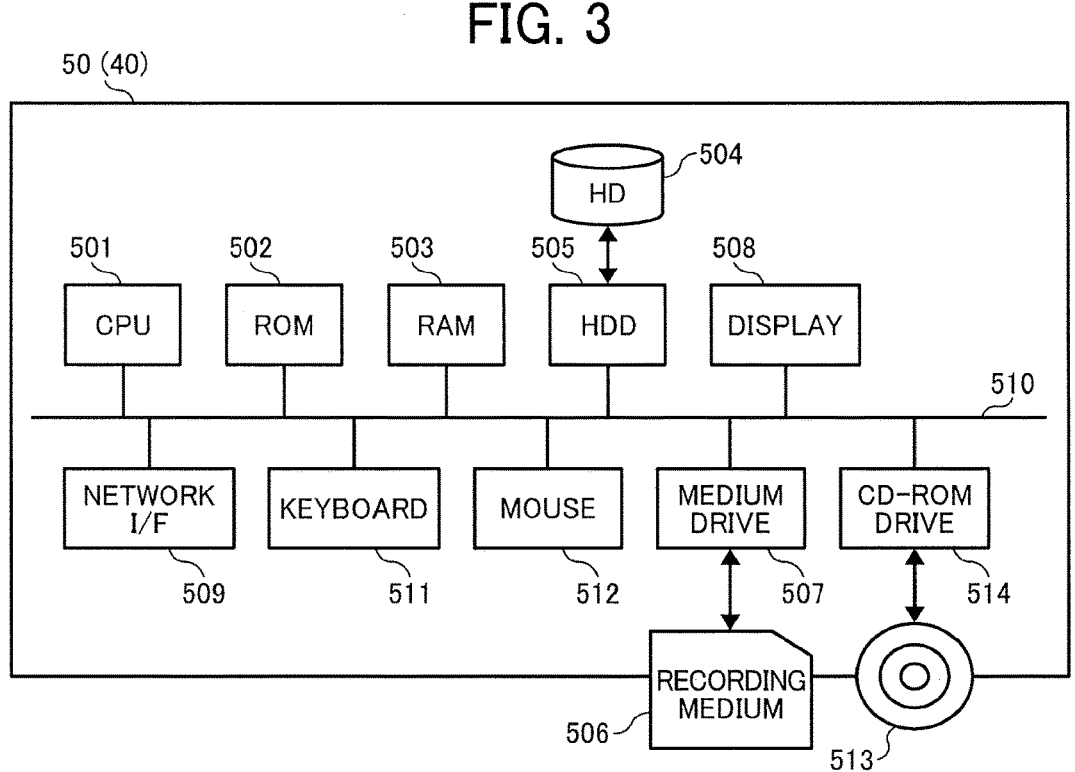
FIG. 3 is a schematic block diagram illustrating a hardware configuration of a management system according to an embodiment of the present invention.

FIG. 3 is a schematic block diagram illustrating a hardware configuration of the management system 50 according to the present embodiment.

The management system 50 according to the present embodiment includes a CPU 501 that controls the entire operation of the communication management system 50, a ROM 502 that stores a control program for controlling the CPU 501 such as the IPL, a RAM 503 that is used as a work area for the CPU 501, a hard disk (HD) 504 that stores various kinds of data such as a control program for the management system 50, a hard disk drive (HDD) 505 that controls reading or writing of various kinds of data to or from the HD 504 under control of the CPU 501, a medium drive 507 that controls reading or writing of data from and to a recording medium 506 such as a flash memory, a display 508 that displays various kinds of information such as a cursor, a menu, a window, a character, and an image, a network interface (I/F) 509 that performs data communication using the communication network 2, a keyboard 511 that is provided with a plurality of keys for allowing a user to input characters, numerical values, or various kinds of instructions, a mouse 512 for selecting or executing various kinds of instructions, selecting an object to be processed, or for moving a cursor, a compact disc read only memory (CD-ROM) drive 514 that reads or writes various kinds of data from and to a CD-ROM 513, which is one example of removable recording medium, and a bus line 510 such as an address bus or a data bus that electrically connects various elements as above to each other as illustrated in FIG. 3. Note that the hardware configuration of the authentication server 40 illustrated in FIG. 1 is similar to that of the communication management system 50, and thus the description of the hardware configuration of the authentication server 40 is omitted.

<Software Configuration of Communication Terminal>

Figure 4:
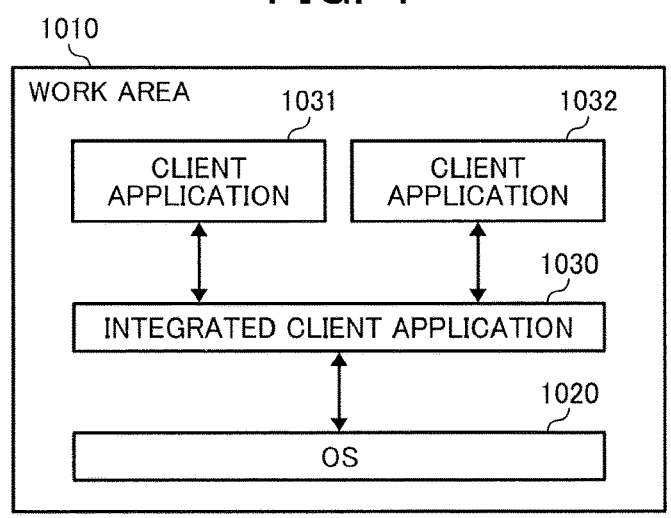
FIG. 4 is a schematic block diagram illustrating a software configuration of a communication terminal according to an embodiment of the present invention.

FIG. 4 is a schematic block diagram illustrating a software configuration of the communication terminal 10 according to the present embodiment.

As illustrated in FIG. 4, the communication terminal 10 is installed with an operating system (OS) 1020, an integrated client application 1030, and client applications 1031 and 1032, and these client applications 1030, 1031, and 1032 may be deployed on a work area 1010 of the RAM 103.

The OS 1020 is basic software that controls entire operation of the communication terminal 10 through providing basic functions. The integrated client application 1030 request the authentication server 40 to perform authentication, and sends at least one of a pub request and a sub request to the management system 50. The integrated client application 1030 manages a presence that indicates the status of each of the client applications 1031 and 1032 based on the information sent from each of the client applications 1031 and 1032. Accordingly, the integrated client application 1030 requests the management system 50 to publish the presence of each client of the communication terminal 10. The client applications 1031 and 1032 communicate with the corresponding client applications of another communication terminal 10, for example, by exchanging contents of data with each other. In order to establish a session with the corresponding client applications of another communication terminal 10, the client applications 1031 and 1032 send a call control message to the corresponding client applications of another communication terminal 10 through the integrated client application 1030.

In FIG. 4, the communication terminal 10 is installed with at least two client applications (for example, the client applications 1031 and 1032). However, no limitation is indicated thereby, and the communication terminal 10 may be installed with one or any number of client applications.

<<Functional Configuration>>

Next, the functional configuration according to the present embodiment is described.

Figure 5:
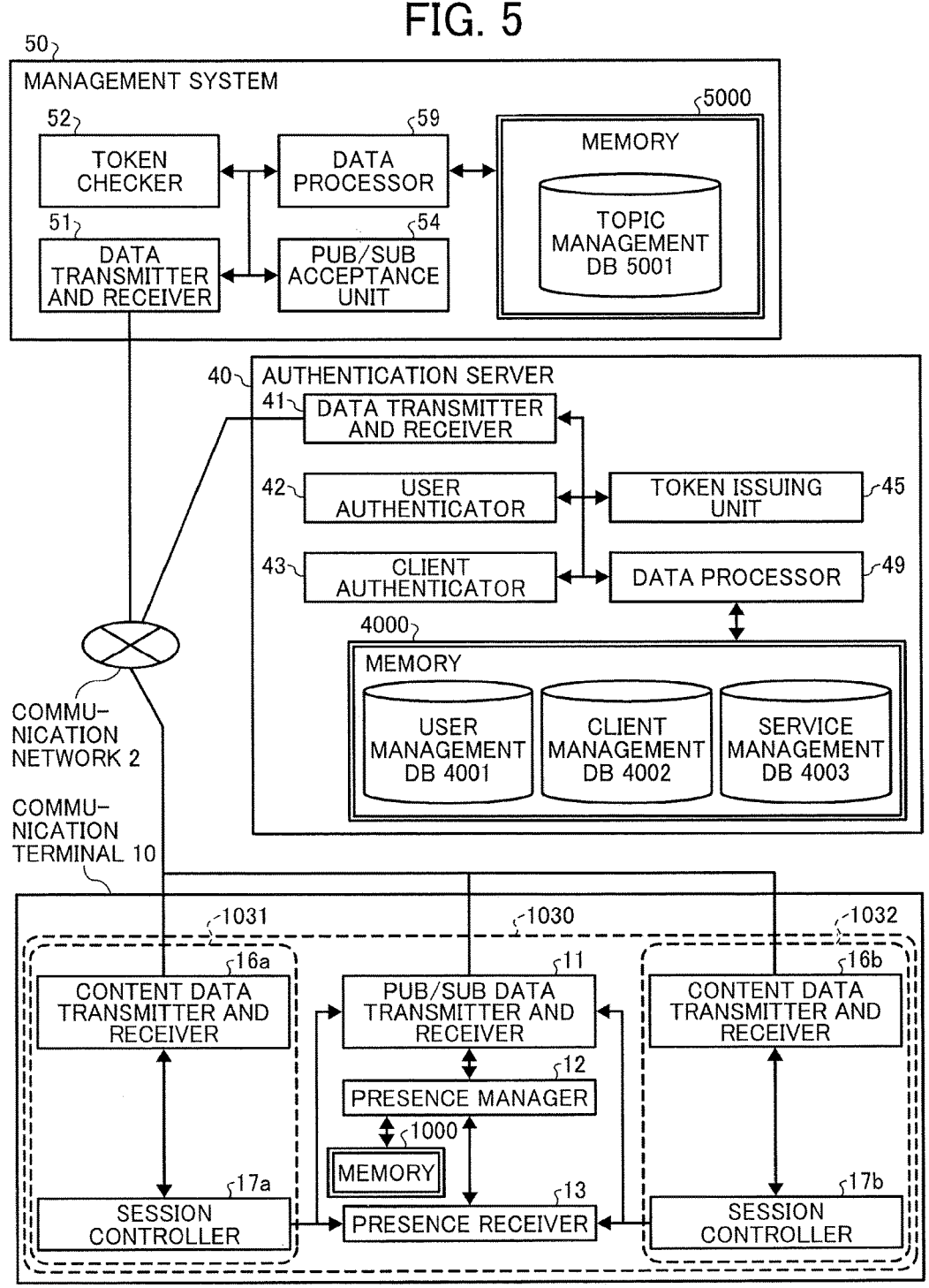
FIG. 5 is a functional block diagram of a communication terminal, an authentication server, and a management system, according to an embodiment of the present invention.

FIG. 5 is a functional block diagram of the communication terminal 10, the authentication server 40, and the management system 50, according to an embodiment of the present invention.

Note that the communication terminal 10, the authentication server 40, and the management system 50 together configure a part of the communication system 1. In FIG. 5, the communication terminal 10, the authentication server 40, and the management system 50 are connected with each other so as to perform data communication through the communication network 2.

<Functional Configuration of Communication Terminal>

The communication terminal 10 includes a pub/sub data transmitter and receiver 11, a presence manager 12, a presence receiver 13, a content data transmitter and receiver 16a, a content data transmitter and receiver 16b, and session controllers 17a and 17b. These elements are functions that are implemented by the operation of some of the hardware components illustrated in FIG. 2 executed by the instructions from the CPU 101 in accordance with a control program expanded from the flash memory 104 onto the RAM 103. Note that the pub/sub data transmitter and receiver 11, the presence manager 12, and the presence receiver 13 are implemented as the integrated communication client that serves as an integrated client operates. The content data transmitter and receiver 16a and the session controller 17a are implemented as the video communication application A that serves as the client application 1031 operates. The content data transmitter and receiver 16b and the session controller 17b are implemented as the video communication application B that serves as the client application 1032 operates. Cases in which two client applications operate are described as above, but three or more client applications may operate. When three or more client applications operate, the content data transmitter and receiver and the session controller of each operating client application operate. The communication terminal 10 further includes a memory 1000 configured by the ROM 102, the RAM 103, and the flash memory 104 illustrated in FIG. 2.

<Detailed Functional Configuration of Communication Terminal>

Next, the functional configuration of the communication terminal 10 is described in detail with reference to FIG. 2 and FIG. 5. In the following description of the functional configuration of the communication terminal 10, the relation of the hardware elements in FIG. 2 with the functional configuration of the communication terminal 10 will also be described.

The pub/sub data transmitter and receiver 11 and the content data transmitter and receivers 16a and 16b are implemented by the instructions from the CPU 101 and the network interface 111, each of which is illustrated in FIG. 2, and transmits or receives various kinds of data (or information) to or from another communication terminal, apparatus, or system, through the communication network 2. The pub/sub data transmitter and receiver 11 sends a pub request and a sub request for messages related to a specific topic to the management system 50 in order to transmit and receive messages related to the topic. The content data transmitter and receiver 16a and the content data transmitter and receiver 16b exchange contents of data with another communication terminal 10.

The presence manager 12 is implemented by the instructions from the CPU 101 illustrated in FIG. 2, and manages the communication status of each client application of the local communication terminal as presence information.

The presence receiver 13 is implemented by the instructions from the CPU 101 illustrated in FIG. 2, and receives presence information sent from the client applications.

The session controllers 17a and 17b are implemented by the instructions from the CPU 101 illustrated in FIG. 2, and control the communication of the client applications 1031 and 1032 based on the call control information exchanged among the communication terminals 10.

The data processor 19 is substantially implemented by the instructions from the CPU 101 and the SSD 105, each of which is illustrated in FIG. 2. The data processor 19 stores various types of data in the memory 1000 or read various types of data from the memory 1000. Note that the data processor 19 may be implemented by the instructions from the CPU 101 only.

<Functional Configuration of Authentication Server>

As illustrated in FIG. 5, the authentication server 40 includes a data transmitter and receiver 41, a user authenticator 42, a client authenticator 43, a token issuing unit 45, and a data processor 49. These units are functions implemented by or caused to function by operating some of the elements illustrated in FIG. 3 under the control of the instructions from the CPU 501. Note also that such instructions from the CPU 501 are made in accordance with a program for the authentication server 40 expanded from the HD 504 to the RAM 503. The authentication server 40 also includes a memory 4000 that is configured by the HD 504 illustrated in FIG. 3.

<User Management Table>

FIG. 6A is a diagram illustrating an example data structure of a user management table, according to the present embodiment.

In the memory 4000, as illustrated in FIG. 5, a user management database (DB) 4001 that is made of a user management table is stored. The authentication management table stores, for each user ID (identifier, identification), the user name and the password in association with each other.

<Client Management Table>

FIG. 6B is a diagram illustrating an example data structure of a client management table, according to the present embodiment.

In the memory 4000, as illustrated in FIG. 5, a client management database (DB) 4002 that is made of a client management table is stored. The authentication management table stores, for each client ID, the client name and the password in association with each other.

<Service Management Table>

FIG. 6C is a diagram illustrating an example data structure of a service management table, according to the present embodiment.

In the memory 4000, as illustrated in FIG. 5, a service management database (DB) 4003 that is made of a service management table is stored. The service management table stores the service name in association with each service ID. According to the present embodiment, the service "transmission management system" that is identified by service ID "S01" is the management system 50. The right of the management system 50 to use the functions of pub/sub is the resource. Note also that the pub/sub service with the use of the management system 50 serves as a scope of authorization in the protocol of OAuth 2.0. Note also that the management system 50 serves as a resource server.

<Detailed Functional Configuration of Authentication Server>

The data transmitter and receiver 41 is implemented by the instructions from the CPU 501 and the network interface 509, each of which is illustrated in FIG. 3, and transmits or receives various kinds of data (or information) to or from another communication terminal, apparatus, or system, through the communication network 2.

The user authenticator 42 is implemented by the instructions from the CPU 501 illustrated in FIG. 3, and performs user authentication in response to a request from a client.

The client authenticator 43 is implemented by the instructions from the CPU 501 illustrated in FIG. 3, and performs client authentication in response to a request from a client.

The token issuing unit 45 is implemented by the instructions from the CPU 501 illustrated in FIG. 3, and issues an authorizing token to be used in the service that a client wishes to access.

The data processor 49 is substantially implemented by the instructions from the CPU 501 and the HDD 505, each of which is illustrated in FIG. 3. The data processor 49 stores various types of data in the memory 4000 or read various types of data from the memory 4000. Note that the data processor 49 may be implemented by the instructions from the CPU 501 only.

<Functional Configuration of Management System>

The management system 50 includes a data transmitter and receiver 51, a token checker 52, a pub/sub acceptance unit 54, and a data processor 59. These units are functions implemented by or caused to function by operating some of the elements illustrated in FIG. 3 under the control of the instructions from the CPU 501. Note also that such instructions from the CPU 501 are made in accordance with a program for the management system 50 expanded from the HD 504 to the RAM 503. The management system 50 also includes a memory 5000 that is configured by the HD 504 illustrated in FIG. 3.

<Topic Management Table>

FIG. 6D is a diagram depicting a topic management table according to the present embodiment.

In the memory 5000, as illustrated in FIG. 5, a topic management database (DB) 5001 that is made of a topic management table is stored. The topic management table stores the client ID and the user ID in association with each topic name. A topic is an attribute associated with a message. Once a client application specifies a topic name and sends a pub request, the management system 50 sends a message to the client application that is specified by the client ID and the user ID that are associated with the specified topic name in the topic management table.

<Detailed Functional Configuration of Management System>

Next, the functional configuration of the management system 50 is described in detail. In the following description of the functional configuration of the management system 50, the relation between the hardware configuration of FIG. 3 and the functional configuration of the management system 50 illustrated in FIG. 5 will also be described.

The data transmitter and receiver 51 is implemented by the instructions from the CPU 501 and the network interface 509, each of which is illustrated in FIG. 3, and transmits or receives various kinds of data (or information) to or from another communication terminal, apparatus, or system, through the communication network 2.

The token checker 52 is implemented by the instructions from the CPU 501, and checks an authorizing token included in the login request sent from the communication terminal 10.

The pub/sub acceptance unit 54 is implemented by the instructions from the CPU 501 illustrated in FIG. 3, and receives a pub request and a sub request from the client.

The data processor 59 is substantially implemented by the instructions from the CPU 501 and the HDD 505, each of which is illustrated in FIG. 3. The data processor 59 stores various types of data in the memory 5000 or read various types of data from the memory 5000. Note that the data processor 59 may be implemented by the instructions from the CPU 501 only.

<Functional Configuration of Other Devices>

The communication terminal 10 may send contents of data to another communication terminal 10 through a relay device. In such cases, the communication system 1 is provided with, for example, a relay device and a relay device management server. Note that the hardware configuration of the relay device management server 20 and the relay device 30 is similar to that of the communication management system 50 illustrated in FIG. 3, and thus the description of the hardware configuration of the relay device management server 20 and the relay device 30 is omitted. The relay device 30 establishes a session with the client applications of multiple communication terminals 10, and relays the contents of data that are sent from the client application of one communication terminal 10 to the client application of another communication terminal 10 through the communication network 2. The relay device management server 20 manages the relay of the contents of data that is performed by the relay device 30. Note that a plurality of relay device management servers 20 and a plurality of relay devices 30 may be provided in the above configuration.

<Functional Configuration of Relay Device Management Server>

Figure 7:
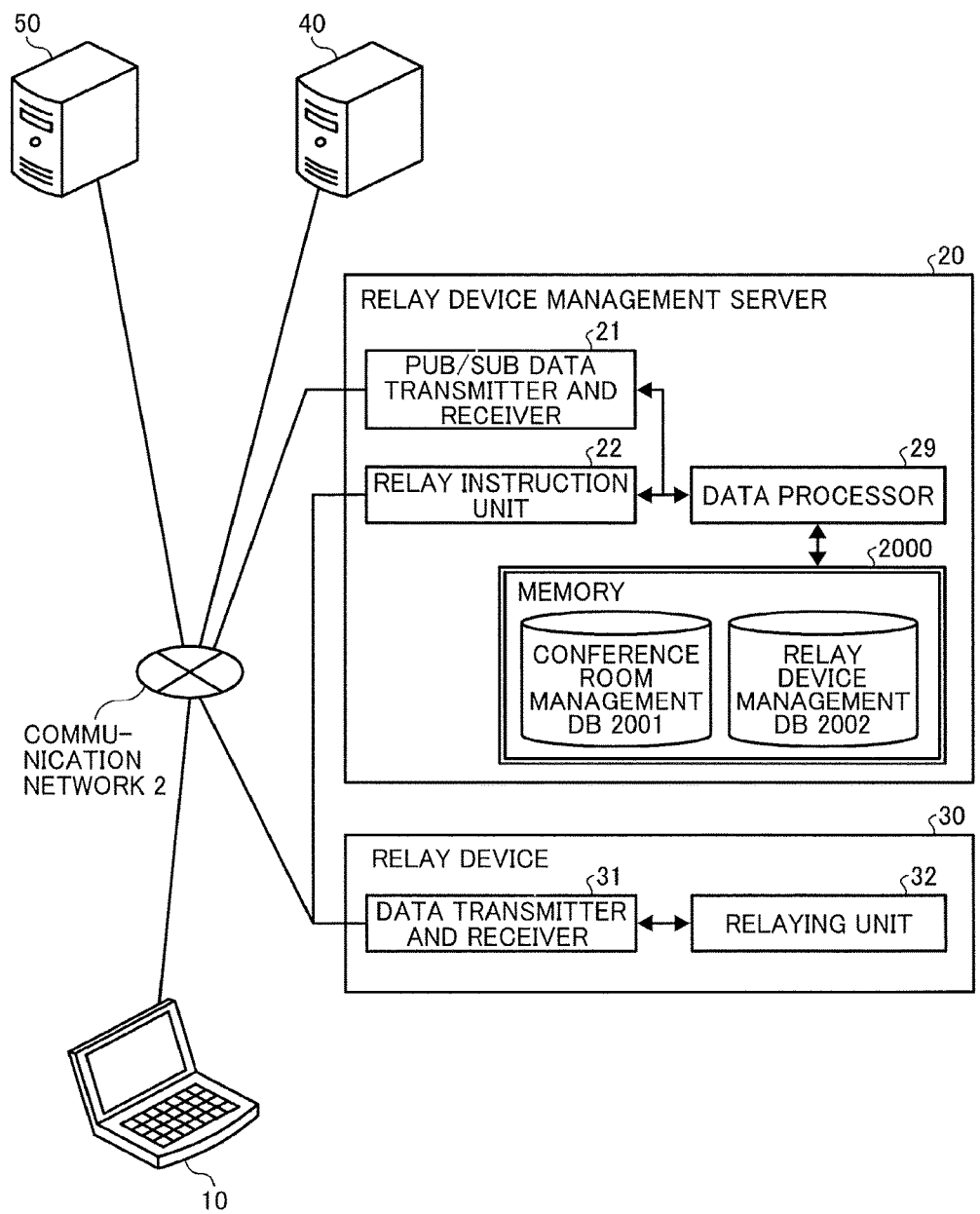
FIG. 7 is a functional block diagram of a relay device management server and a relay device, according an embodiment of the present invention.

FIG. 7 is a functional block diagram of the relay device management server 20 and the relay device 30, according to the present embodiment.

The relay device management server 20 includes a pub/sub data transmitter and receiver 21, a relay instruction unit 22, and a data processor 29. These units are functions implemented by or caused to function by operating some of the elements illustrated in FIG. 3 under the control of the instructions from the CPU 501. Note also that such instructions from the CPU 501 are made in accordance with a program for the relay device management server 20 expanded from the HD 504 to the RAM 503. The relay device management server 20 also includes a memory 2000 that is configured by the HD 504 illustrated in FIG. 3.

<Conference Room Management Table>

FIG. 8A is a diagram illustrating an example data structure of a conference room management table, according to the present embodiment.

In the memory 2000, as illustrated in FIG. 7, a conference room management database (DB) 2001 that is made of a conference room management table is stored. In the conference room management table, conference room ID is associated with a topic name. The topic name indicates the name of a topic indicating a call control message in a session "sed" where contents of data is exchanged between a pair of communication terminals 10. Note also that the conference room ID is identification information that is given to each session "sed" for a video conference among multiple communication terminals 10. The conference room ID may be replaced with, for example, conference ID and session ID.

<Relay Device Management Table>

FIG. 8B is a diagram illustrating an example data structure of a relay device management table, according to the present embodiment.

In the memory 2000, as illustrated in FIG. 7, a relay device management database (DB) 2002 that is made of a relay device management table is stored. In the topic management table, user ID and client ID of each communication terminal 10 that uses the relay device 30 are associated with each other.

<Functional Configuration of Relay Device Management Server>

Next, the functional configuration of the relay device management server is described in detail. In the following description of the functional configuration of relay device management server 20, the relation of the hardware elements in FIG. 3 with the functional configuration of relay device management server 20 in FIG. 7 will also be described.

The pub/sub data transmitter and receiver 21 is implemented by the instructions from the CPU 501 and the network interface 509, each of which is illustrated in FIG. 3, and transmits or receives various kinds of data (or information) to or from another communication terminal, apparatus, or system, through the communication network 2.

The relay instruction unit 22 is implemented by the instructions from the CPU 501 illustrated in FIG. 3, and instructs the relay device 30 to relay the contents of data among the multiple communication terminals 10.

The data processor 29 is substantially implemented by the instructions from the CPU 501 and the HDD 505, each of which is illustrated in FIG. 3. The data processor 29 stores various types of data in the memory 2000 or read various types of data from the memory 2000. Note that the data processor 29 may be implemented by the instructions from the CPU 501 only.

<Functional Configuration of Relay Device>

The relay device 30 includes a data transmitter and receiver 31 and a relaying unit 32. These units are functions implemented by or caused to function by operating some of the elements illustrated in FIG. 3 under the control of the instructions from the CPU 501. Note also that such instructions from the CPU 501 are made in accordance with a program for the relay device 30 expanded from the HD 504 to the RAM 503.

Next, the functional configuration of the relay device 30 is described in detail. In the following description of the functional configuration of the relay device 30, the relation of the hardware elements in FIG. 3 with the functional configuration of the relay device 30 in FIG. 8 will also be described.

The data transmitter and receiver 31 is implemented by the instructions from the CPU 501 and the network interface 509, each of which is illustrated in FIG. 3, and transmits or receives various kinds of data (or information) to or from another communication terminal, apparatus, or system, through the communication network 2.

The relaying unit 32 is implemented by the instructions from the CPU 501 illustrated in FIG. 3, and relays the contents of data among the multiple communication terminals 10.

<Operation>

Next, the operation of the communication terminal 10, the authentication server 40, and the management system 50 that together configure the communication system 1 is described. Firstly, the authentication processes according to the present embodiment are described with reference to FIG. 9.

FIG. 9 is a sequence diagram illustrating the authentication processes according to the present embodiment.

Once a desired client application that is installed in the communication terminal 10 is activated (step S21), the functional units that correspond to the activated client application start the following processes. The client application of the communication terminal 10 obtains user ID and a user password (step S22). No limitation is intended, but the obtaining method may be, for example, a method in which the communication terminal 10 accepts an input of user ID and a password, and a method in which the data processor 19 reads user ID and a password that are stored in advance in the memory 1000.

The pub/sub data transmitter and receiver 11 of the communication terminal 10 requests the authentication server 40 to perform authentication (step S23). The authentication request includes a request to authenticate a user and a request to authenticate a client. The authentication request that is sent to the management system 50 includes the user ID and the user password obtained by the communication terminal 10, client ID and a client password of the activated client application, and service ID that serves as a scope indicating the service to be used. The client ID and the client password may be stored in advance in the memory 1000 and be read by the data processor 19. In the following description, cases in which the service ID included in the authentication request is "S01" that indicates the management system 50 are described.

The data transmitter and receiver 41 of the authentication server 40 receives an authentication request sent from the communication terminal 10. The user authenticator 42 of the authentication server 40 authenticates a user depending on whether or not a pair of the user ID and the user password included in the authentication request is stored in the user management table (see FIG. 6A) (step S24). When a pair of the user ID and the user password included in the authentication request is stored in the user management table, the user authenticator 42 successfully authenticates the user. When a pair of the user ID and the user password included in the authentication request is not stored in the user management table, the user authenticator 42 fails to authenticate the user.

The client authenticator 43 of the authentication server 40 authenticates a client depending on whether or not a pair of the client ID and the client password included in the authentication request is stored in the client management table (see FIG. 6B) (step S25). When a pair of the client ID and the client password included in the authentication request is stored in the client management table, the client authenticator 43 successfully authenticates the client. When a pair of the client ID and the client password included in the authentication request is not stored in the client management table, the client authenticator 43 fails to authenticate the client.

When there is a failure in at least one of the user authentication and the client authentication, the data transmitter and receiver 41 sends an error message indicating a failure in authentication or authorization to the request sender communication terminal 10.

When the user authentication and the client authentication are successful, the token issuing unit 45 of the authentication server 40 issues an authorizing token that indicates that the request sender communication terminal 10 can access the management system 50 (step S27). The authorizing token includes the user name, the client name, the service name that uses this authorizing token, the expiration date, or the like.

In the communication system 1, authentication and authorization can be performed with a protocol such as the OAuth 2.0 and the OpenID Connect. In such cases, a method of exchanging the authentication information such as user ID and a user password and the contents of the authorizing token are determined by the specification of a protocol such as the OAuth 2.0 and the OpenID Connect. In this configuration, the token may be a JSON Web Token (JWT). In order to ensure that the authorizing token is not tampered in the path, the token issuing unit 45 may digitally sign the authorizing token using a secret key. The secret key may be implemented using the RSA (Rivest, Shamir, and Adleman) cryptosystem. Note also that the digital signature may be implemented using a public key cryptography such as the hash-based message authentication code (HMAC). The management system 50 that uses the authorizing token checks the digital signature using a public key or a secret key depending on whether the authorizing token is digitally signed using a secret key or a public key. The digital signature may be implemented using a known standard, for example, the JSON Web Signature (JWS). The authorizing token may be encoded by using, for example, the JSON Web Encryption (JWE), where appropriate.

The data transmitter and receiver 41 incorporates the issued authorizing token into the authentication result, and sends the authentication result to the communication terminal 10. The pub/sub data transmitter and receiver 11 of the communication terminal 10 receives from the authentication server the authentication result that includes the authorizing token. Subsequently, the pub/sub data transmitter and receiver 11 of the communication terminal 10 sends the received authorizing token to the management system 50 to request login (step S28).

The data transmitter and receiver 51 of the communication management system 50 receives the login request sent from the communication terminal 10. The token checker 52 of the management system 50 checks an authorizing token included in the login request (step S29). In this case, the token checker 52 analyzes the authorizing token that is included in the login request according to the standard adopted in the communication system 1. The token checker 52 may determine whether the digital signature that is made by the authentication server is appropriate based on the result of the analysis. When the digital signature that is made by the authentication server is determined to be inappropriate, the token checker 52 determines that the authorizing token included in the login request has been tampered, and fails to authorize the login request.

Subsequently, the token checker 52 checks the expiration date included in the authorizing token to determine whether or not the expiration date of the authorizing token has expired. When the expiration date of the authorizing token is determined to have expired, the token checker 52 fails to authorize the login request due to the expiration of the authorizing token.

Subsequently, the token checker 52 checks whether or not the authorizing token includes the service name that corresponds to the management system 50. When the authorizing token is determined not to include the service name that corresponds to the management system 50, the token checker 52 fails to authorize the login request.

When the token checker 52 fails to authorize the login request due to the check processes of any one of the digital signature, expiration date, and the service name of the authorizing token, the data transmitter and receiver 51 sends to the communication terminal 10 authorization result information indicating that the authorization ended in failure. When the token checker 52 determines that the digital signature, expiration date, and the service name of the authorizing token are all valid, the use of the service by the user and the client specified in the authorizing token is authorized. Once the user and the client are authorized, the management system 50 establishes a session with the communication terminal 10 (step S30). In such cases, the management system 50 sends to the communication terminal 10 authorization result information indicating that the authorization was successful.

Once the session is established, the management system 50 stores in the memory 1000 the user name of the client, the client name, the IP address of the client, or the like included in the authorizing token in association with each other. Due to this configuration, the management system 50 can figure out the user name of the client (of the request sender) and the client name, without the client's sending the user name and the client name to the management system 50 every time the client sends data to the management system 50.

The processes in the steps S21 to S30 as above are performed for each of the client applications activated in the communication terminal 10. For example, the video communication application A, the video communication application B, and the integrated communication client may use a shared user password or user ID to send an authentication request to the authentication server 40. When the management system 50 has successfully authenticated the client applications, a plurality of sessions are simultaneously established between the management system 50 and the client applications, respectively.

Next, the processes in which the client application 1031 starts communication among the multiple communication terminals 10 are described with reference to FIG. 10 and FIG. 11.

Figure 10:
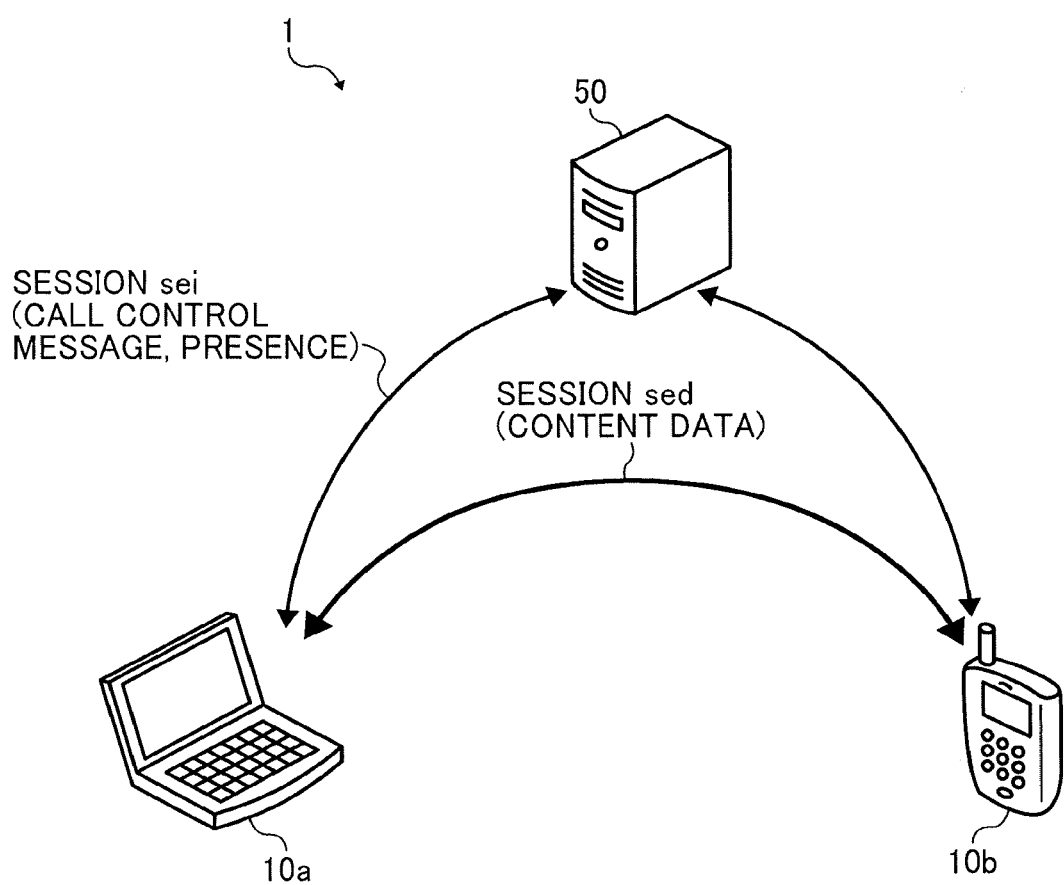
FIG. 10 is a diagram illustrating communication status among a plurality of communication terminals, according to an embodiment of the present invention.

FIG. 10 is a diagram illustrating the communication status between the communication terminals 10*a* and 10*b*, according to the present embodiment.

Figure 11:
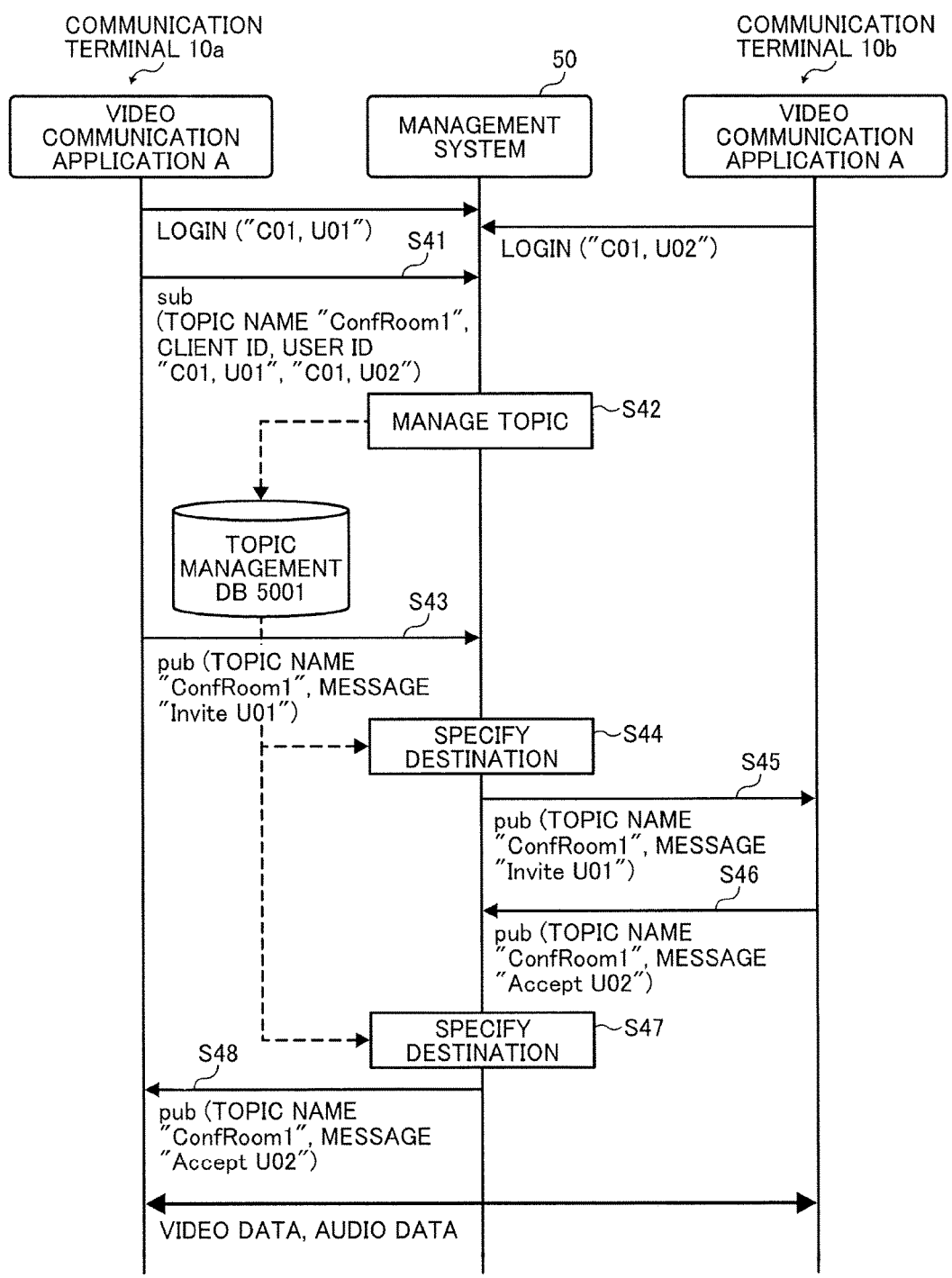
FIG. 11 is a sequence diagram illustrating the processes of starting communication among a plurality of communication terminals, according to an embodiment of the present invention.

FIG. 11 is a sequence diagram illustrating the processes of starting communication among a plurality of communication terminals, according to the present embodiment.

Hereinafter, the processes in which a message is published and subscribed to between the video communication application A of the communication terminal 10*a* that the user "a" uses and the video communication application A of the communication terminal 10*b* that the user "b" uses, which are examples of the multiple communication terminals 10, are described. In the following description, the user ID of the user "a", the user ID of the user "b", and the client ID of the video communication application A are referred to as "U01", "U02", and "C01", respectively.

In a similar manner to the processes in the steps S21 to S30 as described above, the client application "video communication application A" of the communication terminal 10*a* uses the user ID "U01" and the client ID "C01" to log into the management system 50 through the pub/sub data transmitter and receiver 11. In a similar manner to the processes in the steps S21 to S30 as described above, the client application "video communication application A" of the communication terminal 10*b* uses the user ID "U02" and the client ID "C01" to log into the management system 50 through the pub/sub data transmitter and receiver 11. Accordingly, a session "sei" for exchanging a message using a publish-subscribe pattern is established between the communication terminals 10*a* and 10*b* and the management system 50.

The session controller 17*a* of the communication terminal 10*a*, which is implemented by the video communication application A, sends a sub request to the management system 50 through the pub/sub data transmitter and receiver 11 in order for the video communication applications A of the communication terminals 10*a* and 10*b* to receive a message that is associated to the topic name "ConfRoom1" (step S41). The sub request in the step S41 includes the user ID "U01" and the client ID "C01" on the communication terminal 10*a* side, the user ID "U02" and the client ID "C01" on the communication terminal 10*b* side, and the topic name "ConfRoom1". The topic that is identified by the topic name "ConfRoom1" includes a call control message for the video communication applications A of the communication terminals 10*a* and 10*b*.

The data transmitter and receiver 51 of the communication management system 50 receives the sub request sent by the video communication application A of the communication terminal 10a. The pub/sub acceptance unit 54 of the management system 50 registers the topic name, the user ID, and the client ID, which are included in the received sub request, in association with each other in the topic management table (step S42). Accordingly, each of the video communication application A of the communication terminal 10a and the video communication application A of the communication terminal 10b can receive a message that is associated with the topic name "ConfRoom1".

Next, processes after a request to start a phone conversation between the user "a" and the user "b" is accepted in the communication terminal 10a are described. The session controller 17a of the communication terminal 10a requests the management system 50 to publish a message "InviteU01" with the topic name "ConfRoom1" through the pub/sub data transmitter and receiver 11 (step S43). Note that the message "InviteU01" indicates that the video communication application A that the user "a" uses requests to start video communication.

The data transmitter and receiver 51 of the communication management system 50 receives the above pub request. Subsequently, the pub/sub acceptance unit 54 uses the topic name "ConfRoom1", which is included in the received pub request, as a search key to searches the topic management table (see FIG. 6D). Then, the pub/sub acceptance unit 54 extracts the pair "C01, U02" of the associated client ID and user ID, and specifies a destination to which a message is to be sent (step S44). In so doing, the pub/sub acceptance unit 54 specifies, as a destination, the video communication application A of the communication terminal 10b that has used the pair "C01, U02" of the client ID and the user ID to log into the management system 50 (step S44).

The pub/sub acceptance unit 54 of the management system 50 sends the message and the topic name, which are sent from the video communication application A of the communication terminal 10a, to the video communication application A of the communication terminal 10b, based on the result of the above specifying process (step S45). The session controller 17a of the communication terminal 10b, which is implemented by the video communication application A, receives the message sent from the management system 50 through the pub/sub data transmitter and receiver 11.

Next, processes after a request to start a phone conversation between the user "a" and the user "b" is accepted in the communication terminal 10a are described. The session controller 17a of the communication terminal 10b requests the management system 50 to publish a message "AcceptU02" with the topic name "ConfRoom1" through the pub/sub data transmitter and receiver 11 (step S46). Note that the message "AcceptU02" indicates that the video communication application A that the user "b" uses accepts to start video communication.

The data transmitter and receiver 51 of the communication management system 50 receives the pub request for messages associated with the above topic name "ConfRoom1". Then, in a similar manner to the step S44, the pub/sub acceptance unit 54 specifies, as a destination of messages, the video communication application A of the communication terminal 10a that has used the pair "C01, U01" of the client ID and the user ID to log into the management system 50 (step S47).

The pub/sub acceptance unit 54 of the management system 50 sends the message and the topic name, which are sent from the video communication application A of the communication terminal 10b, to the video communication application A of the communication terminal 10a, based on the result of the above specifying process (step S48). The session controller 17b of the communication terminal 10a receives the message sent from the management system 50 through the pub/sub data transmitter and receiver 11.

Subsequently, the content data transmitter and receiver 16a of the communication terminal 10a, which is implemented by the video communication application A, calls the communication terminal 10b. No limitation is intended, but for example, when the user ID is associated with contact information that identifies the device, such as a telephone number or an IP address, the content data transmitter and receiver 16b may call the destination address that is associated with the user ID "U02". When the content data transmitter and receiver 16a of the communication terminal 10b, which is implemented by the video communication application A, receives the call, the session "sed" is established between the video communication application A of the communication terminal 10a and the video communication application A of the communication terminal 10b. Accordingly, through the established session "sed", contents of data such as image data, video data, and audio data may be exchanged between the video communication application A of the communication terminal 10a and the video communication application A of the communication terminal 10b.

Next, the processes in which the client application 1032 starts communication among the multiple communication terminals 10 are described with reference to FIG. 12, FIG. 13A, and FIG. 13B.

Figure 12:
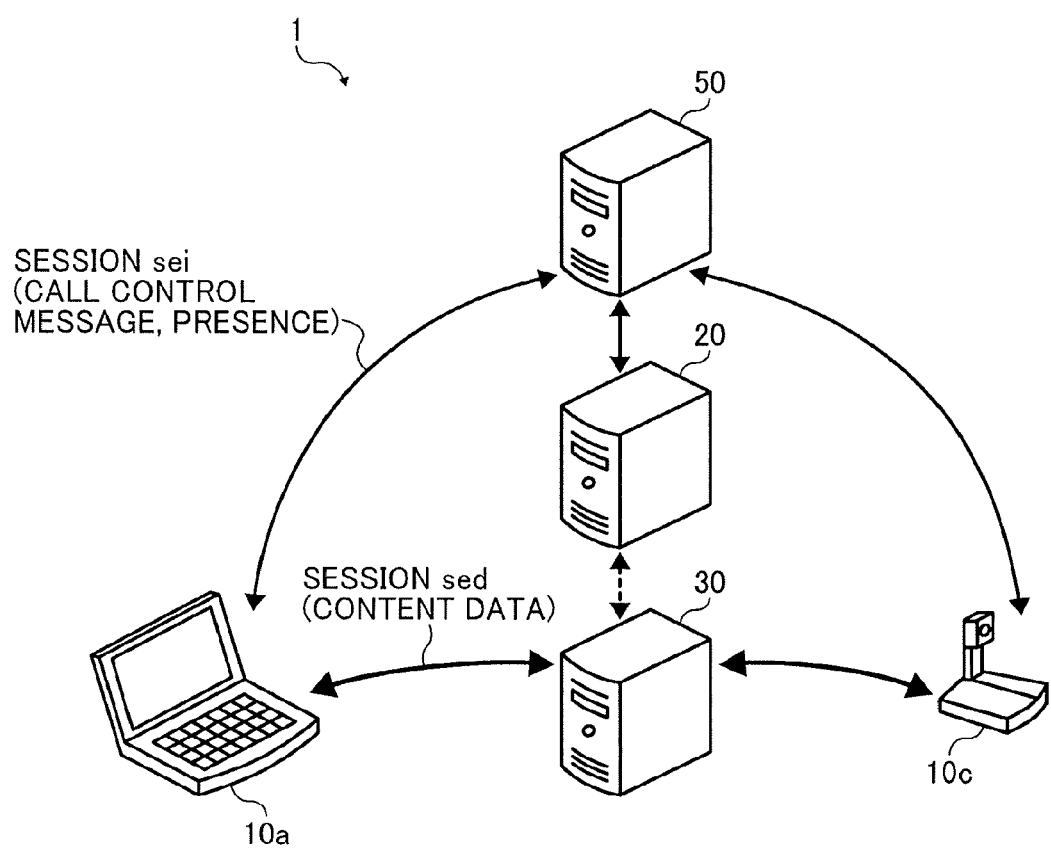
FIG. 12 is a diagram illustrating communication status among a plurality of communication terminals, according to an embodiment of the present invention.

FIG. 12 is a diagram illustrating the communication status between the communication terminals 10a and 10c, according to the present embodiment.

Figure 13A:
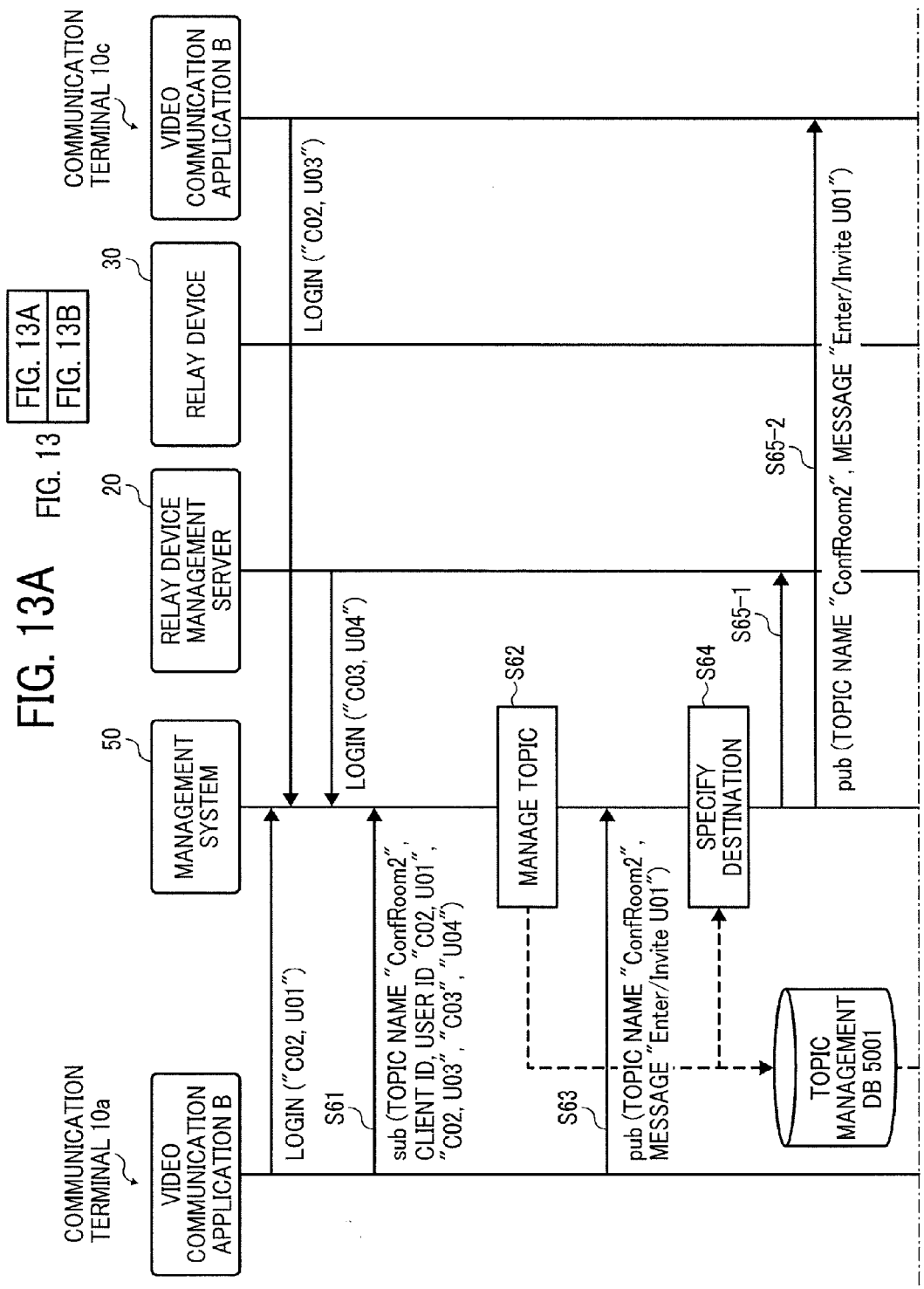
FIG. 13A and FIG. 13B are a sequence diagram illustrating the processes of starting communication among a plurality of communication terminals, according to an embodiment of the present invention.
Figure 13B:
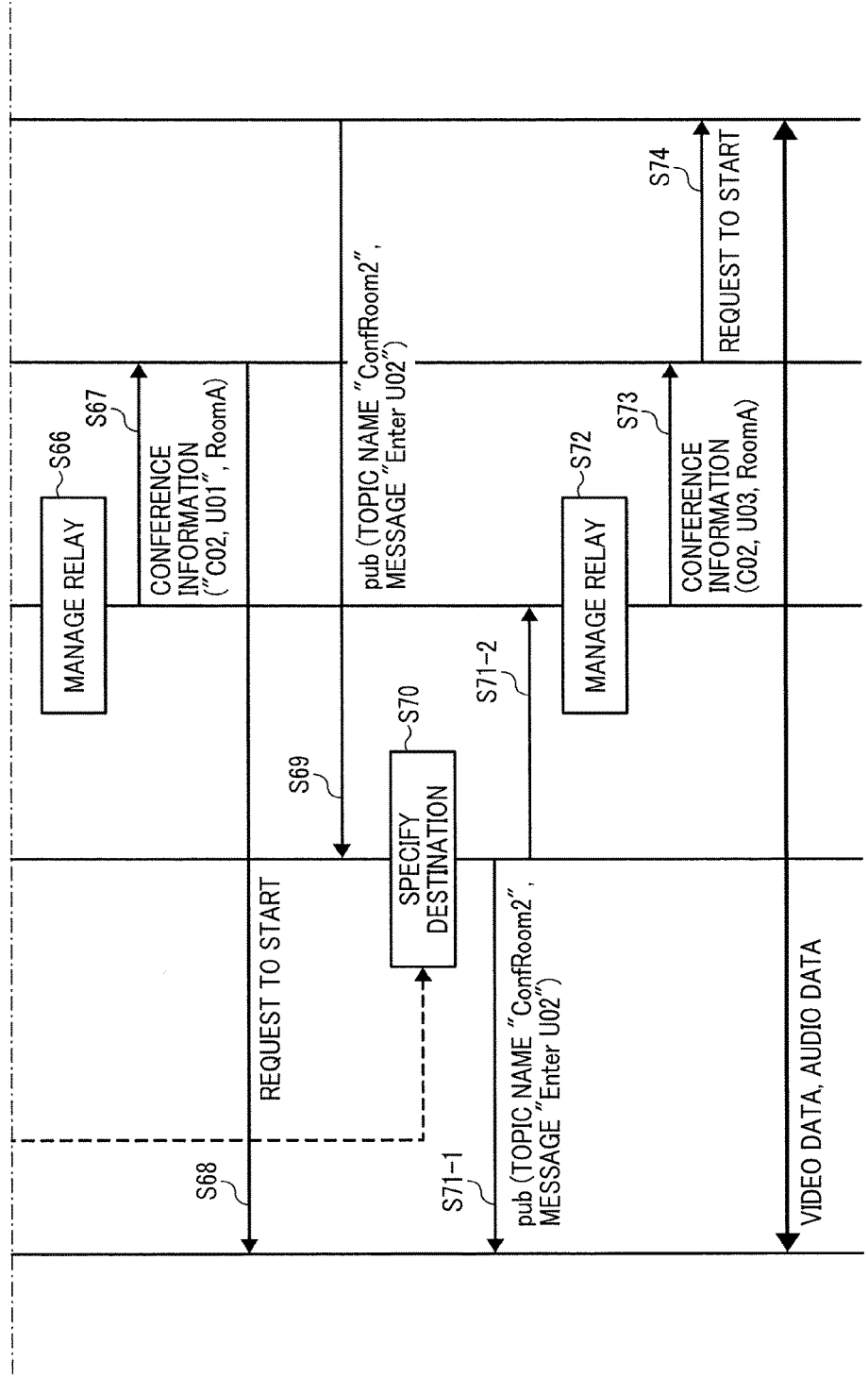

FIG. 13A and FIG. 13B are a sequence diagram illustrating the processes of starting communication between the communication terminals 10a and 10c, according to the present embodiment.

Hereinafter, the processes in which the communication starts between the video communication application B of the communication terminal 10a that the user "a" uses and the video communication application B of the communication terminal 10b that the user "b" uses, which are examples of the multiple communication terminals 10, are described. In the following description, the user ID of the user "a", the user ID of the user "c", and the client ID of the video communication application B are referred to as "U01", "U03", and "C02", respectively. Moreover, the user ID of the user of the relay device management application is referred to as "U04", and the client ID of the relay device management application is referred to as "C03".

In a similar manner to the processes in the steps S21 to S30 as described above, the client application "video communication application B" of the communication terminal 10a uses the user ID "U01" and the client ID "C02" to log into the management system 50 through the pub/sub data transmitter and receiver 11. In a similar manner to the processes in the steps S21 to S30 as described above, the client application "video communication application B" of the communication terminal 10c uses the user ID "U03" and the client ID "C02" to log into the management system 50 through the pub/sub data transmitter and receiver 11. In a similar manner to the processes in the steps S21 to S30 as described above, the client application "relay device management application" of the relay device management server 20 uses the user ID "U04" and the client ID "C03" to log into the management system 50 through the pub/sub data transmitter and receiver 21. Accordingly, a session "sei" for exchanging a message using a publish-subscribe pattern is established among the communication terminals 10a and 10c, the relay device management server 20, and the management system 50. Note that the communication terminal 10a is connected to the management system 50 by establishing a session that is different from the session that is used by the video communication application A to log into the management system 50 using the user ID "U01" and the client ID "C01".

The session controller 17b of the communication terminal 10a, which is implemented by the video communication application B, sends a sub request to the management system 50 through the pub/sub data transmitter and receiver 11 in order for the video communication applications B of the communication terminals 10a and 10e and the relay device management application of the relay device management server 20 to receive a message that is associated to the topic name "ConfRoom2" (step S61). The sub request in the step S61 includes the user ID "U01" and the client ID "C02" on the communication terminal 10a side, the user ID "U03" and the client ID "C02" on the communication terminal 10c side, the user ID "U04" and the client ID "C03" on the relay device management server 20 side, and the topic name "ConfRoom2". The topic that is identified by the topic name "ConfRoom2" includes a call control message for the video communication applications B of the communication terminals 10a and 10c.

The data transmitter and receiver 51 of the communication management system 50 receives the sub request sent by the video communication application B of the communication terminal 10a. The pub/sub acceptance unit 54 of the management system 50 register the topic name, the user ID, and the client ID, which are included in the received sub request, in association with each other in the topic management table (step S43). Accordingly, each of the video communication application B of the communication terminal 10a, the video communication application A of the communication terminal 10c, and the relay device management application of the relay device management server 20 can receive a message that is associated with the topic name "ConfRoom2".

Next, processes after a request to start a phone conversation between the user "a" and the user "c" is accepted in the communication terminal 10a are described. The session controller 17b of the communication terminal 10a requests the management system 50 to publish a message "Enter/InviteU01" with the topic name "ConfRoom2" through the pub/sub data transmitter and receiver 11 (step S63). Note that the message "Enter/InviteU01" indicates that the video communication application B that the user "a" uses requests to start video communication and enters a virtual conference room.

The data transmitter and receiver 51 of the communication management system 50 receives the above pub request. Subsequently, the pub/sub acceptance unit 54 uses the topic name "ConfRoom2", which is included in the received pub request, as a search key to searches the topic management table (see FIG. 6D). Then, the pub/sub acceptance unit 54 extracts the pairs "C02, U03" and "C03, U04" of the associated client ID and user ID, and specifies a destination to which a message is to be sent (step S64). In so doing, the pub/sub acceptance unit 54 specifies, as a destination, the video communication application B of the communication terminal 10c that has used the pair "C02, U03" of the client ID and the user ID to log into the management system 50 (step S64). In a similar manner, the pub/sub acceptance unit 54 specifies, as a destination, the relay device management application of the relay device management server 20 that has used the pair "C03, U04" of the client ID and the user ID to log into the management system 50 (step S64).

The pub/sub acceptance unit 54 of the management system 50 sends the message and the topic name, which are sent from the video communication application B of the communication terminal 10a, to the video communication application B of the communication terminal 10c and the relay device management application of the relay device management server 20, based on the result of the above specifying process (step S65-1, step S65-2). The session controller 17b of the communication terminal 10c, which is implemented by the video communication application B, receives the message sent from the management system 50 through the pub/sub data transmitter and receiver 11. In a similar manner, the pub/sub data transmitter and receiver 21 of the relay device management server 20 receives the message sent from the management system 50.

The relay instruction unit 22 of the relay device management server 20 refers to the field of topic name in the conference room management table (see FIG. 8A) to select an available record. For example, when the record that is associated with the conference room ID "RoomA" is available in the conference room management table, the relay instruction unit 22 registers the topic name "ConfRoom2" included in the received message with that available record (step S66). As part of the processes in the step S66, the relay instruction unit 22 of the relay device management server 20 registers the pair "C02, U01" of the client ID and the user ID of the communication terminal 10a, which is the request sender of the message, with the relay device management table.

The relay instruction unit 22 of the relay device management server 20 sends conference information including the conference room ID "RoomA", which corresponds to the record selected in the step S66, and the pair "C02, U01" of the client ID and the user ID of the communication terminal 10a, which is the request sender of the message, to the relay device 30 (step S67). The data transmitter and receiver 31 of the relay device 30 receives the conference information sent from the relay device management server 20.

The data transmitter and receiver 31 of the relay device 30 sends the conference room ID "RoomA" to the video communication application B of the communication terminal 10a that is identified by the pair "C02, U01" of the client ID and the user ID. Moreover, the relay device 30 requests the video communication application B of the communication terminal 10a to start exchanging contents of data with the channel of the relay device 30 indicated by the conference room ID "RoomA" (step S68). Accordingly, a session "sed" is established between the video communication application B of the communication terminal 10a and the relay device 30 to exchange contents of data therebetween.

Next, processes after a request to start a phone conversation between the user "a" and the user "c" is accepted in the communication terminal 10c are described. The session controller 17b of the communication terminal 10c requests the management system 50 to publish a message "EnterU02" with the topic name "ConfRoom2" through the pub/sub data transmitter and receiver 11 (step S69). Note that the message "EnterU02" indicates that the video communication application B that the user "c" uses requests to join a conference.

The data transmitter and receiver 51 of the communication management system 50 receives the pub request for messages associated with the above topic name "ConfRoom2". Then, in a similar manner to the step S64, the pub/sub acceptance unit 54 specifies, as a destination of messages, the video communication application A of the communication terminal 10a that has used the pair "C02, U01" of the client ID and the user ID to log into the management system 50 (step S70). In a similar manner to the step S64, the pub/sub acceptance unit 54 specifies, as a destination of messages, the relay device management application of the relay device management server 20 that has used the pair "C03, U04" of the client ID and the user ID to log into the management system 50 (step S70).

The pub/sub acceptance unit 54 of the management system 50 sends the message and the topic name, which are sent from the video communication application B of the communication terminal 10c, to the video communication application B of the communication terminal 10a and the relay device management application of the relay device management server 20, based on the result of the above specifying process (step S71-1, step S71-2). The session controller 17b of the communication terminal 10a, which is implemented by the video communication application B, receives the message sent from the management system 50 through the pub/sub data transmitter and receiver 11. In a similar manner, the pub/sub data transmitter and receiver 21 of the relay device management server 20 receives the message sent from the management system 50.

The relay instruction unit 22 of the relay device management server 20 registers the pair "C02, U03" of the client IP and the user ID of the communication terminal 10c, which is the request sender of the message, with the relay device management table (step S72).

The relay instruction unit 22 of the relay device management server 20 sends conference information including the conference room ID "RoomA", which corresponds to the topic name "ConfRoom2" in the conference room management table (see FIG. 8A), and the pair "C02, U03" of the client ID and the user ID of the communication terminal 10c, which is the request sender of the message, to the relay device 30 (step S73). The data transmitter and receiver 31 of the relay device 30 receives the conference information sent from the relay device management server 20.

The data transmitter and receiver 31 of the relay device 30 sends the conference room ID "RoomA" to the video communication application B of the communication terminal 10c that is identified by the pair "C02, U03" of the client ID and the user ID. Moreover, the relay device 30 requests the video communication application B of the communication terminal 10c to start exchanging contents of data with the channel of the relay device 30 indicated by the conference room ID "RoomA" (step S74). Accordingly, a session "sed" is established between the video communication application B of the communication terminal 10c and the relay device 30 to exchange contents of data therebetween.

Once the session "sed" between the communication terminal 10a and the relay device 30 and the session between the communication terminal 10c and the relay device 30 are established, the relaying unit 32 relays the contents of data such as image data, video data, and audio data sent from one of the communication terminals 10a and 10c to the other one of the communication terminals 10a and 10c. Accordingly, the conversation between the communication terminals 10a and 10c can be started.

Next, the processes in which the communication status of the clients of the communication terminals 10 are managed are described with reference to FIG. 14A and FIG. 14B.

Figure 14A:
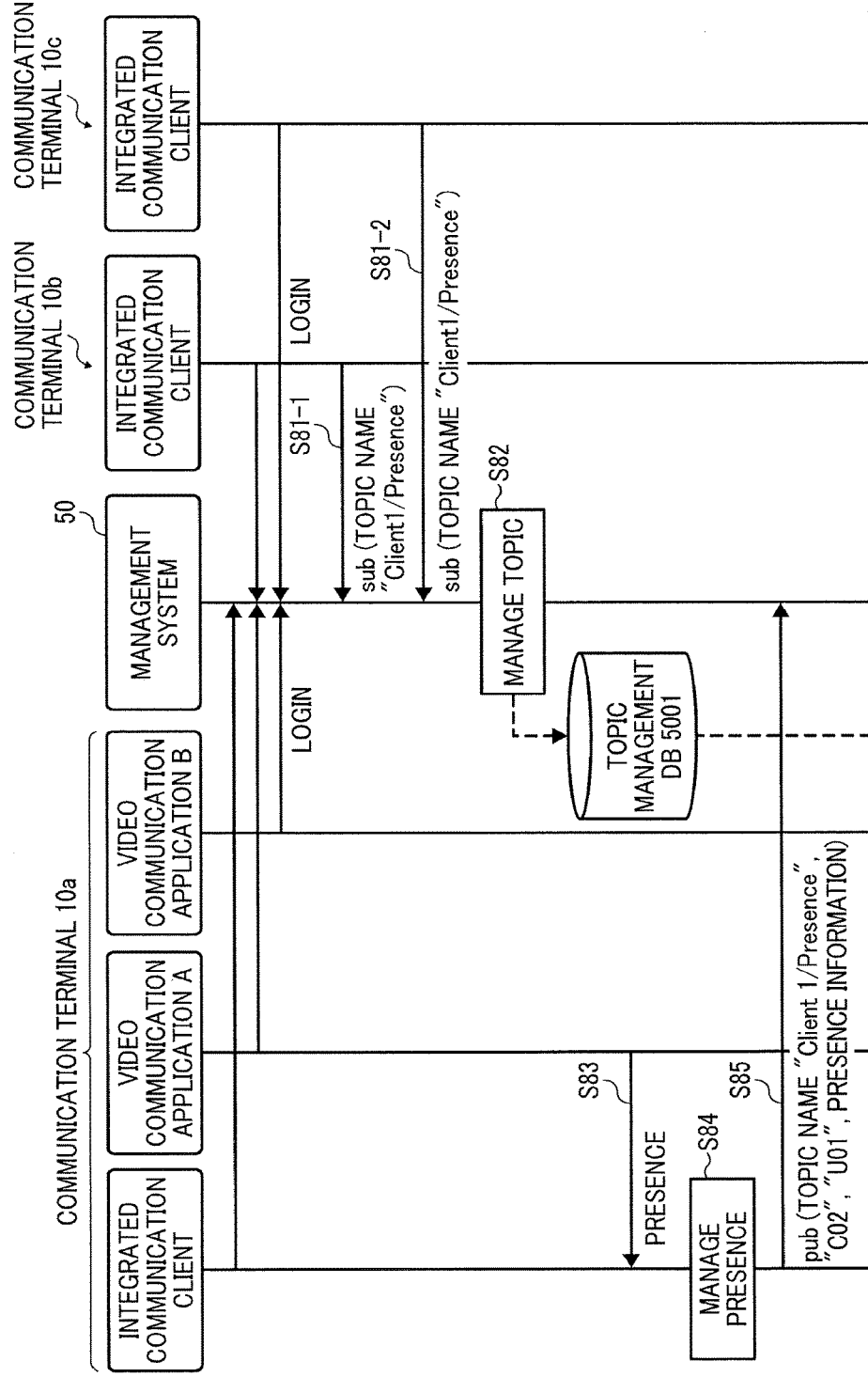
FIG. 14A and FIG. 14B are a data sequence diagram illustrating the operation of managing the communication status of a plurality of communication terminals, according to an embodiment of the present invention.
Figure 14B:
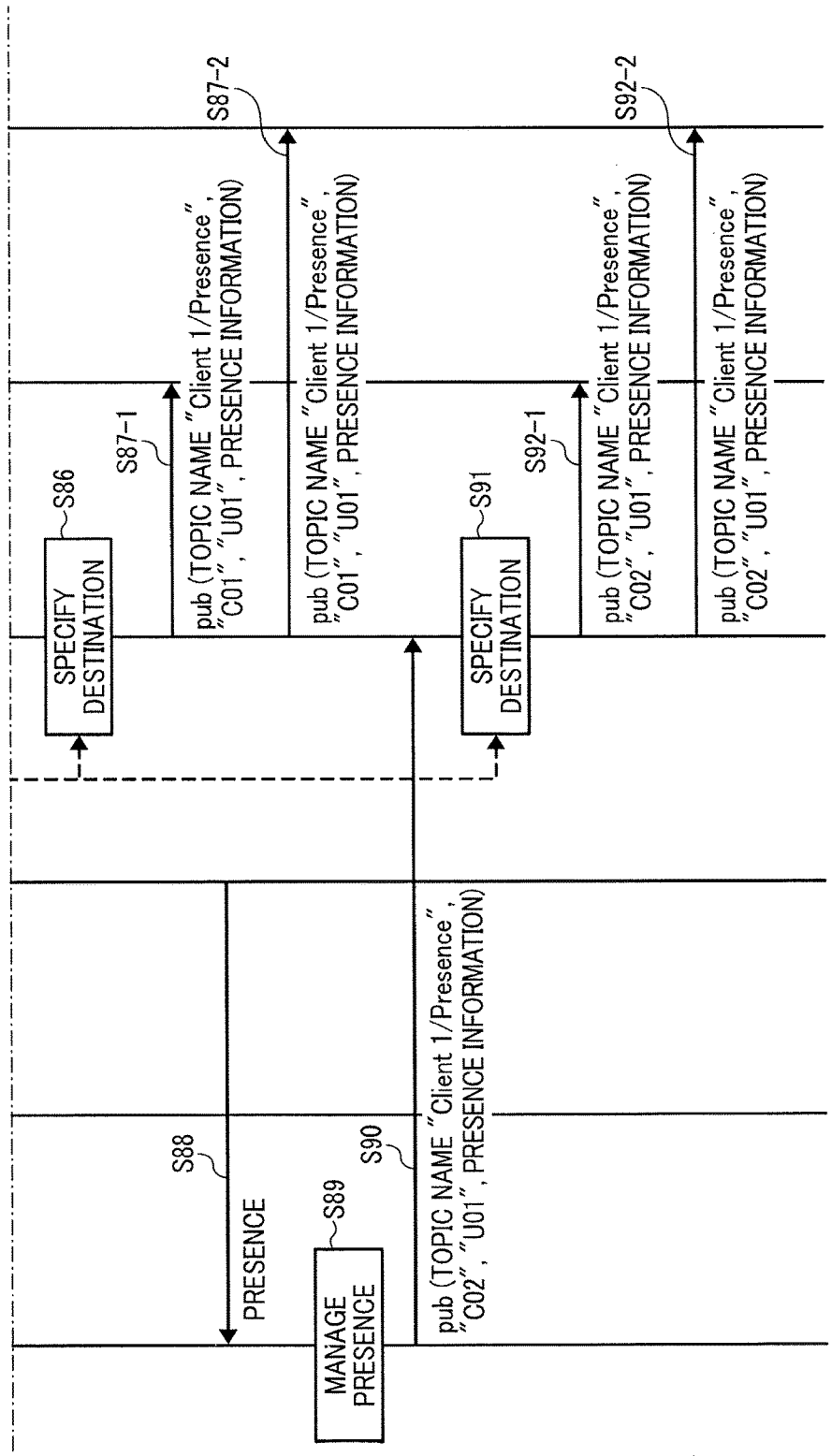

FIG. 14A and FIG. 14B are a data sequence diagram illustrating the operation of managing the communication status of a plurality of communication terminals, according to the present embodiment.

In the following description, the user ID of the user "a", the user ID of the user "b", the user ID of the user "c", and the client ID of the integrated communication client are referred to as "U01", "U02", "U03", and "C04", respectively.

In a similar manner to the processes in the steps S21 to S30 as described above, the client application "video communication applications A and B" of the communication terminal 10a uses the user ID "U01" and the client ID "C01 or C02" to log into the management system 50 through the pub/sub data transmitter and receiver 11. In a similar manner to the processes in the steps S21 to S30 as described above, the integrated communication client of the communication terminals 10a, 10b, and 10c use the user ID "U01, U02, or U03" and the client ID "C04" to log into the management system 50 through the pub/sub data transmitter and receiver 11.

The pub/sub data transmitter and receiver 11 of the communication terminal 10b sends to the management system 50 a sub request to receive messages associated with the topic name "Client1/Presence" (step S81-1). The sub request in the step S81-1 includes the user ID "U02" and the client ID "C04" on the communication terminal 10b side that is the request sender, and the topic name "Client1/Presence". The topic that is identified by the topic name "Client1/Presence" includes presence information that indicates the communication status of the communication terminals 10.

The pub/sub data transmitter and receiver 11 of the communication terminal 10c sends to the management system 50 a sub request to receive messages associated with the topic name "Client1/Presence" (step S81-2). The sub request in the step S81-2 includes the user ID "U03" and the client ID "C04" on the communication terminal 10c side that is the request sender, and the topic name "Client1/Presence".

The data transmitter and receiver 51 of the communication management system 50 receives the sub request sent by the integrated communication client of the communication terminals 10b and 10c. The pub/sub acceptance unit 54 of the management system 50 register the topic name, the user ID, and the client ID, which are included in the received sub request, in association with each other in the topic management table (step S82). Accordingly, each of the integrated communication clients of the communication terminals 10b and 10c can receive a message that is associated with the topic name "Client1/Presence".

On the other hand, the communication terminal 10a performs control according to a message every time the session controllers 17a and 17b, which are implemented by the video communication application A and the video communication application B, respectively, transmits or receives a call control message through the pub/sub data transmitter and receiver 11. No limitation is intended, but the control that is performed by the communication terminal 10a includes, for example, control to ring dial tone in response to the transmission of a message, control to ring a ringtone in response to the reception of a message, and control to establish communication in response to the reception of a response of communication allowance. Then, the communication terminal 10a sends presence information indicating the communication status of the applications of the communication terminal 10a to presence receiver 13 according to the above control. For example, when the communication is established in response to a call control message, the session controller 17a, which is implemented by the video communication application A, sends to presence receiver 13 the presence information "in session" that indicates the communication status that is changed by the above control (step S83).

Once the presence receiver 13 receives presence information, presence manager 12 stores the client ID of the client application (i.e., the video communication application A) of the request sender of presence information, the user ID of the user of the video communication application A, and the received presence information in association with each other in the memory 1000. Accordingly, the presence of the video communication application A is managed (step S84).

Note that the presence manager 12 may manage the communication status of the client application according to the function of the client application. For example, in cases where the client application is adapted to communication among three sites, when the presence receiver 13 receives the presence information that indicates "in session" for the first time, the presence manager 12 manages the presence information "in session (participation allowed)" that indicates the status of the client application. Then, when presence receiver 13 receives presence information that indicates "in session" for the second time, the presence manager 12 may manage the presence information "in session (participation not allowed)" that indicates the status of the client application.

Moreover, the presence manager 12 may manage the communication status of a client that is different from the source of presence information depending on the implementation of the local communication terminal 10. For example, cases in which each of the video communication application A and the video communication application B can occupy one microphone are described. When presence information indicating "in session" is sent from the session controller 17a, which is implemented by the video communication application A, to presence receiver 13, the microphone 114 that is built into the communication terminal 10 is occupied by the communication performed by the video communication application A. The presence manager 12 determines whether or not an external microphone is connected to the external device connection interface 118. When it is determined that an external microphone is connected to the external device connection interface 118, the presence manager 12 stores in the memory 1000 the client ID "C02" of the video communication application B, the user ID "U01", and presence information "standby" that indicates a state where a conference can be started. On the other hand, when it is determined that an external microphone is not connected to the external device connection interface 118, the presence manager 12 stores in the memory 1000 the client ID "C02" of the video communication application B, the user ID "U01", and presence information "not available" that indicates a state where a conference cannot be started.

Every time new presence information is stored by presence manager 12 or at a prescribed timing, the pub/sub data transmitter and receiver 11 of the communication terminal 10a sends to the management system 50 a pub request to publish the pair of the client ID, the user ID, and presence information stored in the memory 1000 as the topic name "Client1/Presence" (step S85).

The data transmitter and receiver 51 of the communication management system 50 receives the above pub request. Subsequently, the pub/sub acceptance unit 54 uses the topic name "Client1/Presence", which is included in the received pub request, as a search key to search the topic management table (see FIG. 6D). Then, the pub/sub acceptance unit 54 extracts the pairs "C04, U02" and "C04, U03" of the associated client ID and user ID, and specifies a destination to which a message is to be sent (step S86). In so doing, the pub/sub acceptance unit 54 specifies, as destinations, the integrated communication client of the communication terminal 10b that has used the pair "C04, U02" of the client ID and the user ID to log into the management system 50 as well as the integrated communication client of the communication terminal 10c that has used the pair "C04, U03" of the client ID and the user ID to log into the management system 50.

The pub/sub acceptance unit 54 of the management system 50 sends the message and the topic name, which are sent from the integrated communication client of the communication terminal 10a, to the integrated communication clients of the communication terminals 10b and 10c, based on the result of the above specifying process (step S87-1, step S87-2). The pub/sub data transmitter and receiver 11 of the communication terminals 10b and the pub/sub data transmitter and receiver 11 of the communication terminal 10c receive the message sent from the management system 50. Accordingly, the communication terminals 10b and 10c can grasp the communication status of the communication terminal 10a for each client application.

The presence management that is performed when the session controller 17a, which is implemented by the video communication application A, transmits or receives a call control message to control the communication by the video communication application A is described as above. The presence management that is performed when the session controller 17b, which is implemented by the video communication application B, transmits or receives a call control message to control the communication by the video communication application B (step S88 to step S92-1 and step S92-2) is similar to the processes in the steps S83 to S87-1 and S87-2) as above, and thus the description is omitted.

<<Modification of Example Embodiment>>

Next, a modification of the embodiments of the present invention is described. In particular, differences in configuration from the embodiments as described above are described.

Figure 15:
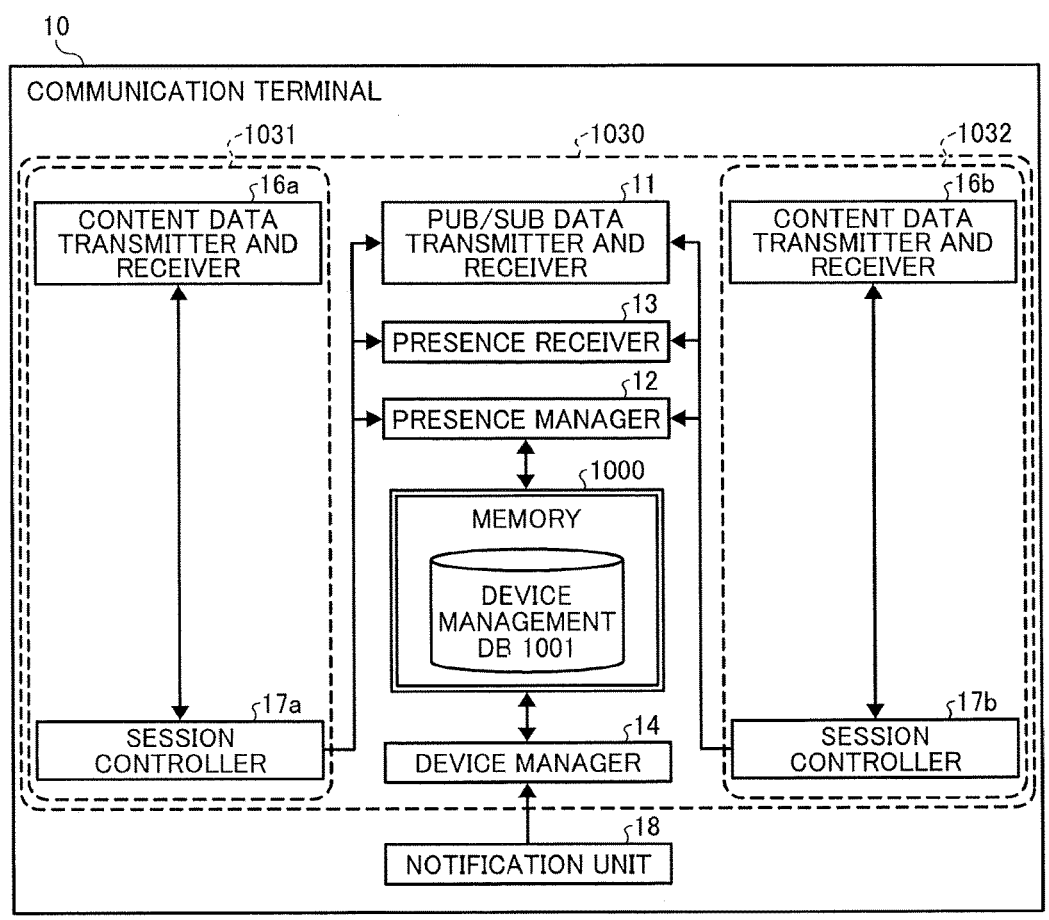
FIG. 15 is a functional block diagram of a communication terminal according to a modification of an embodiment of the present invention.

FIG. 15 is a functional block diagram of the communication terminal 10 according to a modification of the embodiment described above.

<Device Management Table>

Table 1 is a diagram illustrating a device management table according to the present embodiment. In the memory 1000, as illustrated in FIG. 15, a device management database (DB) 1001 that is made of a device management table is stored. In the device management table, the device names of devices that are built into or externally provided for the communication terminal 10, the total number of the devices, and the number of available devices that are not used by any client application are associated with each other.

TABLE 1

| DEVICE NAME | TOTAL NUMBER OF DEVICES | NUMBER OF AVAILABLE DEVICES |
|---|---|---|
| CAMERA | 1 | 1 |
| MICROPHONE | 1 | 1 |
| PEN TABLET | 1 | 1 |
| ... | ... | ... |

Figure 16:
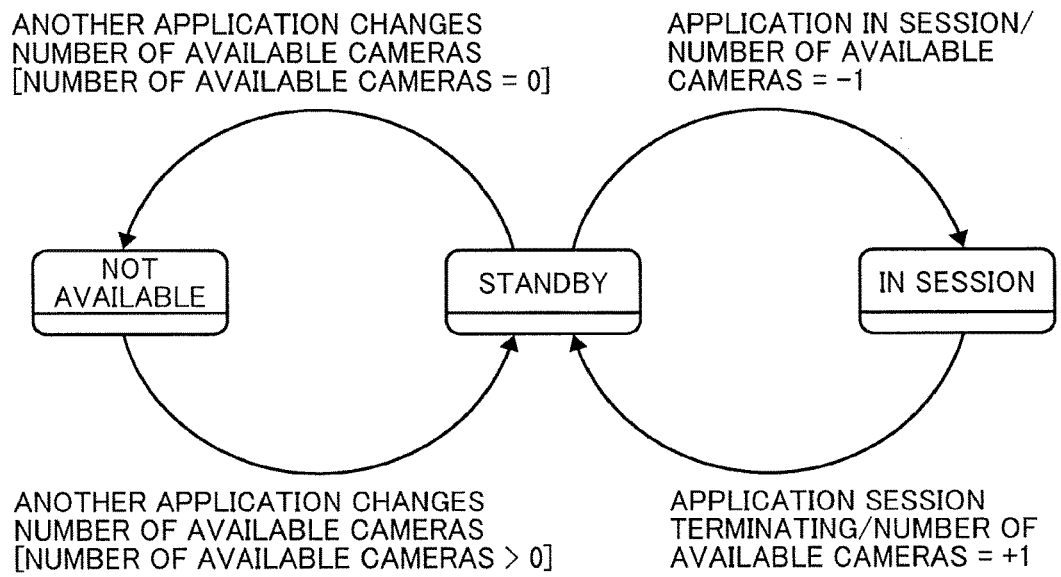
FIG. 16 is a diagram illustrating a state machine managed by a communication terminal, according to a modification of an embodiment of the present invention.

FIG. 16 is a diagram illustrating a state machine managed by the presence manager 12 of the communication terminal 10, according to the present modification.

The presence manager 12 of the communication terminal 10 manages a state machine as illustrated in FIG. 16 according to instructions from the CPU 101. The presence manager 12 manages a state machine for every client application that is executed in the communication terminal 10. Note that the state machine illustrated in FIG. 16 corresponds to the video communication application A. In the state machine illustrated in FIG. 16, each arrow joins the starting status to the terminating status. Near the arrows, events that trigger state transition are described. Next to some of the events, an event that newly occurs due to each event is described across a slash.

The communication terminal 10 according to the present modification is provided with a device manager 14, and the device manager 14 of the communication terminal 10 is implemented by the instructions from the CPU 101 according to the integrated client application 1030. The device manager 14 manages the number of devices that are built into or externally connected to the communication terminal 10.

The communication terminal 10 according to the present modification is provided with a notification unit 18, and the notification unit 18 of the communication terminal 10 is implemented by the instructions from the CPU 101 according to the OS 1020. Once the plug and play (PnP) function of the OS 1020 recognizes the connection or disconnection of a device, the notification unit 18 of the communication terminal 10 notifies the integrated client application 1030 of a PnP event that indicates the connection or disconnection of the device.

Figure 17:
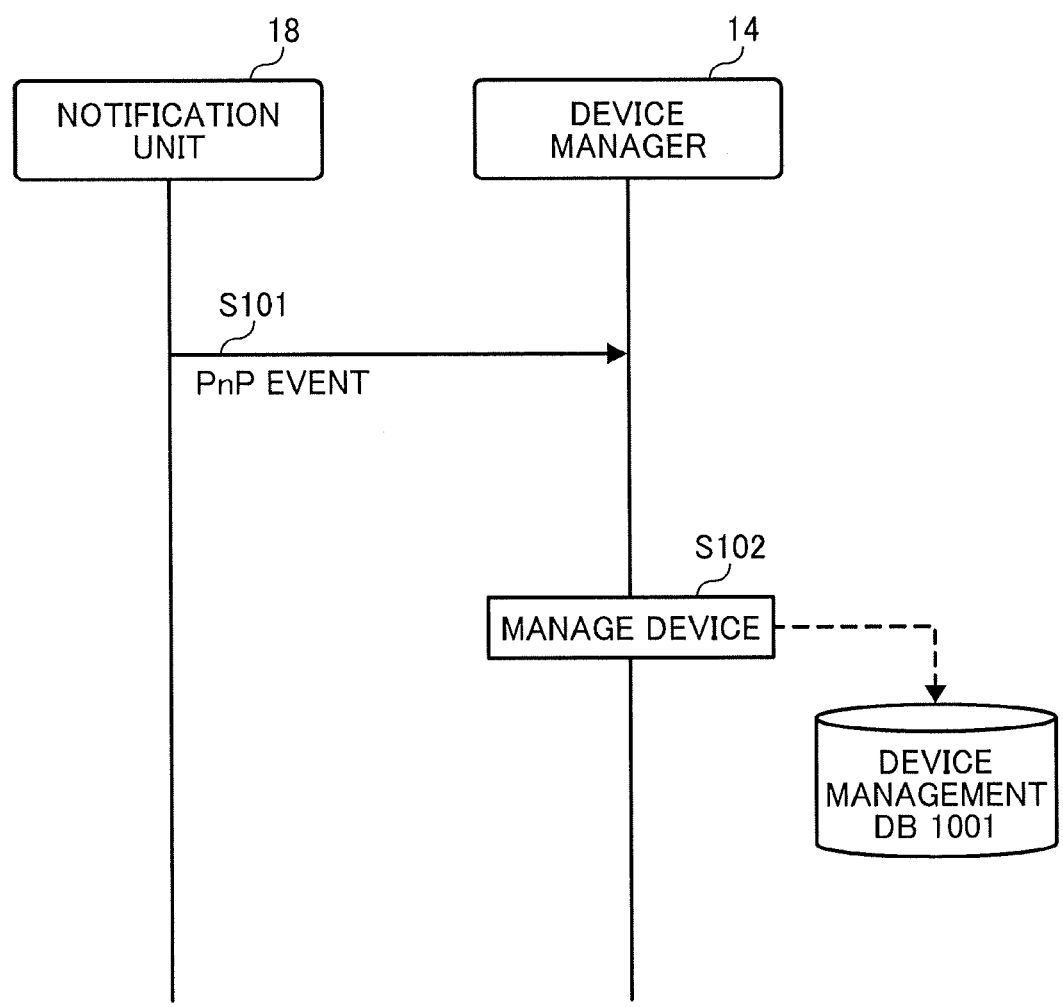
FIG. 17 is a sequence diagram illustrating the processes of managing the total number of devices that are built into or externally connected to a communication terminal, according to a modification of an embodiment of the present invention.

FIG. 17 is a sequence diagram illustrating the processes of managing the total number of devices that are built into or externally connected to the communication terminal 10, according to the present modification.

When the connection of a device that is built into the communication terminal 10 is recognized or the connection of an external device is connected or disconnected, the notification unit 18 of the communication terminal 10 notifies the integrated client application 1030 of a plug and play (PnP) event that indicates the connection or disconnection of a device based on the recognition (step S101). Here, the object device is a device that can be used by the video communication applications A and B that serve as client applications. For example, when the notification unit 18 recognizes the connection of the camera 112 that is built into the communication terminal 10, the notification unit 18 notifies the integrated client application 1030 of a PnP event that indicates the connection of the camera. In a similar manner, when the notification unit 18 recognizes the connection or disconnection of an external camera, the notification unit 18 notifies the integrated client application 1030 of a PnP event that indicates the connection or disconnection of the camera.

On the integrated client application 1030 side, the device manager 14 receives a PnP event. The device manager 14 manages the number of devices that are connected to the local communication terminal according to the contents of the received PnP event (step S102). For example, when the device manager 14 receives a PnP event that indicates the connection of a camera, the device manager 14 increases the total number of devices that are registered as camera and the number of available devices by one in the device management table. For example, when the device manager 14 receives a PnP event that indicates the disconnection of a camera, the device manager 14 decreases the total number of devices that are registered as camera and the number of available devices by one in the device management table.

Next, processes in which the presence manager 12 manages the presence information that indicates the status of each client application are described with reference to FIG. 18.

Figure 18:
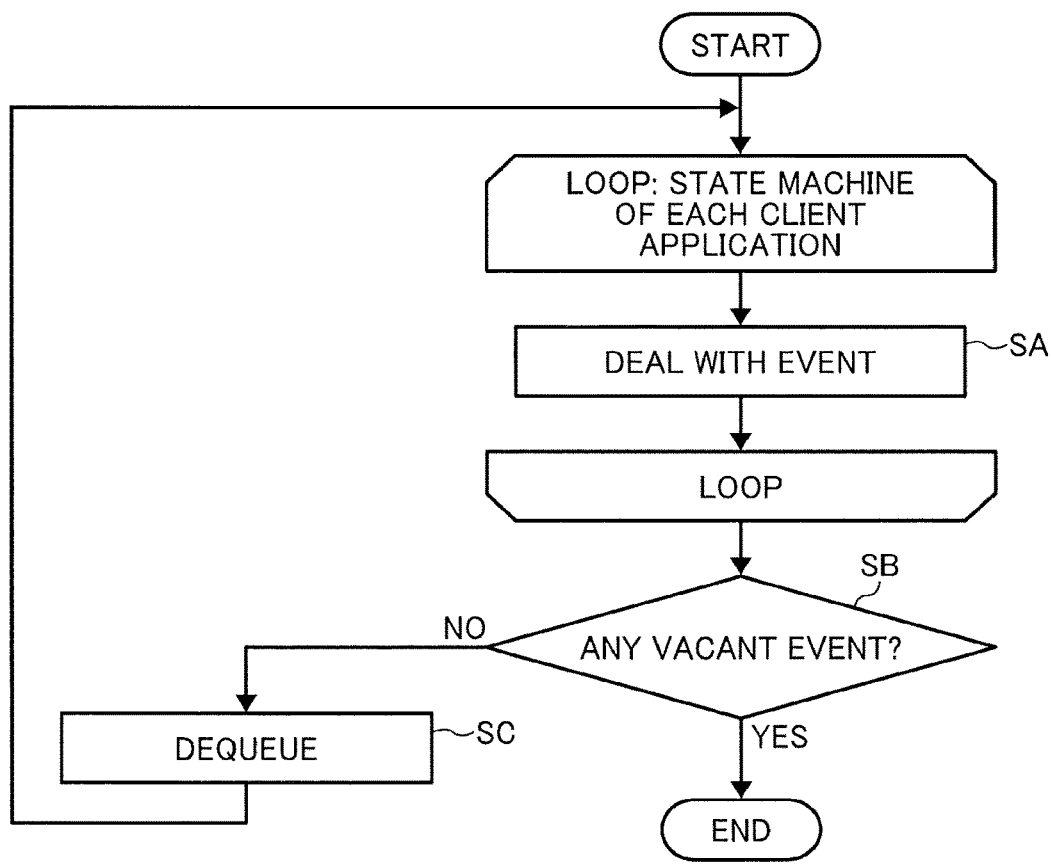
FIG. 18 is a flowchart of the processes of managing presence, according to a modification of an embodiment of the present invention.

FIG. 18 is a flowchart of the processes of managing presence, according to the present modification.

It is assumed that when these processes are to be started, the presence information of the video communication applications A and B indicates "standby" in the memory 1000. Moreover, it is assumed that the device management table is as depicted in Table 1.

Next, for example, the processes that are performed in the step S84 when the presence information "in session" is sent from the video communication application A of the communication terminal 10a to the integrated communication client in the step S83 are described.

The presence receiver 13 of the communication terminal 10a receives the presence information "in session" sent from the video communication application A. Accordingly, an event that indicates that the video communication application A is "in session" occurs.

The presence manager 12 deals with the event in accordance with a state machine that corresponds to each client application (step SA). As the event indicating that the video communication application A is "in session" is occurring, the presence manager 12 changes the presence information of the video communication application A, which is stored in the memory 1000, from "standby" to "in session" in accordance with the state machine that corresponds to the video communication application A. Moreover, the presence manager 12 changes the number of available cameras, which is stored in the device management table, from "1" to "0" in accordance with the state machine that corresponds to the video communication application A. In this stage, the video communication application A starts using the camera 112, where the number of available devices is changed.

Accordingly, a new event that indicates that the number of available cameras is to be changed from "1" to "0" is enqueued. Due to the processes of dealing with the event that indicates that the video communication application A is "in session", an event that indicates that the number of available cameras is to be changed from "1" to "0" occurs. Accordingly, the presence manager 12 determines in a step SB that the event queue is not vacant ("NO" in the step SB).

When it is determined to be "NO" in the step SB, the presence manager 12 dequeues the event that indicates that the number of available cameras is to be changed from "1" to "0" (step SC).

The presence manager 12 returns to the step SA and prepares for a new event in accordance with a state machine that corresponds to each client application. Here, as the event indicating that the number of available cameras is to be changed from "1" to "0" is occurring due to the video communication application A, the presence manager 12 changes the presence information of the video communication application A, which is stored in the memory 1000, from "standby" to "not available" in accordance with the state machine that corresponds to the video communication application B.

As a result, the event queue becomes vacant, and the presence manager 12 determines in the step SB that the event queue is vacant ("YES" in a step SB), and terminates the process. The subsequent processes of transmitting presence information of each client application to another communication terminal 10 are similar to the processes in the steps S85 to S87-1 and S87-2, and thus its repeated description is omitted.

Note also that the processes depicted in FIG. 18 are executed every time any one of the events in a state machine occurs. The events in a state machine includes, for example, the transmission of presence information from the video communication application B to the integrated communication client in the step S88 and the occurrence of a PnP event in the step S101.

Next, some effects of the above example embodiments of the present invention are described. With the output method according to the embodiments described above, the presence manager 12 of the communication terminal 10 stores the presence information of the video communication application A in the memory 1000 according to the transmission of a call control message that is transmitted by the video communication application A. Note that the video communication application A serves as a first communication application. Note also that the call control message serves as call control information, and the presence information of the video communication application A serves as a first status. Moreover, presence manager 12 of the communication terminal 10 stores the presence information of the video communication application B in the memory 1000 according to the device that is used by the video communication application A. The device that is used by the video communication application A serves as a resource, and the presence information of the video communication application B serves as a second status. The pub/sub data transmitter and receiver 11 of the communication terminal 10 produces an output by sending to the management system 50 the presence information on the video communication applications A and B side stored in the memory 1000. Note that the pub/sub data transmitter and receiver 11 serves as an output unit, and presence information serves as status information. Accordingly, the communication terminal 10 can output the status of each client application depending on the implemented resources.

The device management DB 1001 of the communication terminal 10 manages the number of available devices that are available for the video communication applications A and B. Note that the device management DB 1001 serves as a resource manager. The pub/sub data transmitter and receiver 11 of the communication terminal 10 outputs the presence information of the video communication application B based on the number of available devices that is stored in the device management DB 1001. Accordingly, when there are a plurality of devices, the communication terminal 10 can output presence information depending on the number of available devices.

The device manager 14 of the communication terminal 10 updates the number of available devices stored in the device management DB 1001 according to the connection or disconnection of a device or the start or termination of the use of a device. Note that the device manager serves as an update unit and the connection or disconnection of a device is an example of the deletion or addition of a resource. Accordingly, the device management DB 1001 of the communication terminal 10 can dynamically manage the number of available devices.

The pub/sub data transmitter and receiver 11 of the communication terminal 10 sends, for each of the video communication applications A and B, a pub request and a sub request for a call control message to the management system 50. Note that the pub/sub data transmitter and receiver 11 serves as a transmitter and the management system 50 serves as a publish-subscribe server. Accordingly, the integrated client of the communication terminal 10 can manage call control messages exchanged among clients in an integrated manner, and the integrated client of the communication terminal 10 can correctly output presence information of the video communication applications A and B.

The pub/sub data transmitter and receiver 11 of the communication terminal 10 sends a pub request and a sub request for presence information to the management system 50. Accordingly, the communication terminal 10 can send presence information to a counterpart communication terminal 10 that is connected to the management system 50, and the communication terminal 10 can obtain presence information of the counterpart communication terminal.

The pub/sub data transmitter and receiver 11 of the communication terminal 10 uses a shared user ID to send a pub request and a sub request to the management system 50. Note that the user ID serves as an account. Accordingly, the communication terminal 10 can manage the communication that is performed by each client application as if the communication is performed on a one-by-one basis.

The communication system 1 may further be provided with the relay device management server 20 that manages the relay of contents of data among multiple communication terminals 10. Note that the relay device management server 20 is an example of a relay control device. The relay device management server 20 sends a sub request for a call control message sent by the video communication application B to the management system 50. Accordingly, the relay device management server 20 can obtain the call control message that is exchanged among the multiple communication terminals 10, and can send instructions to start the relay to the relay device 30 based on the obtained call control message.

The control programs for the communication terminal 10, the relay device management server 20, the relay device 30, the authentication server 40, and the management system 50 may be recorded in a file in a format installable or executable on a computer-readable recording medium such as the recording medium 106 for distribution. Examples of the recording medium include, but not limited to, a compact disc-recordable (CD-R), a digital versatile disk (DVD), and a Blu-ray disc.

Note also that a recording medium such as a CD-ROM storing the programs according to the example embodiment as described above or the HD 504 storing these programs may be distributed as a program product at home and abroad.

The communication terminal 10, the relay device management server 20, the relay device 30, the authentication server 40, and the management system 50 according to the embodiment as described above may be configured by a single computer or a plurality of computers to which functions or units are allocated as desired in a divided manner. Alternatively, the authentication server 40 and the management system 50 may be implemented by a single computer (one or more processors).

The functions according to the embodiments that are described as above can be implemented by one or a plurality of processing circuits. The processing circuit herein includes, for example, devices such as a processor that is programmed to execute software to implement functions, like a processor with electronic circuits, an application specific integrated circuit (ASIC) that is designed to execute the above functions, and a circuit module known in the art.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A communication terminal, comprising:
processing circuitry configured to output first status information indicating a first status related to presence of a first client communication application among a plurality of client communication applications according to call control information transmitted by the first communication application, and output second status information indicating a second status related to presence of a second client communication application among the plurality of client communication applications, the second status being determined according to whether the resource is being used by the first client communication application in the first status; and
a transmitter configured to send, for each of the plurality of client communication applications, a pub request to publish the call control information and a sub request to subscribe to the call control information to a publish-subscribe server,
wherein the processing circuitry is further configured to execute an integrated client application that causes the processing circuitry to
manage a presence that indicates a status of each of the client communication applications, based on the information sent from each of the client communication applications;
request the publish-subscribe server to publish the presence of each client of the communication terminal; and
transmit a call control message sent by the client communication applications to the corresponding client communication applications of another communication terminal.

2. The communication terminal according to claim 1, wherein the processing circuitry is further configured to manage a number of available resources, and output the second status information according to the managed number of the available resources.

3. The communication terminal according to claim 2, wherein the processing circuitry is further configured to update the managed number of the available resources according to deletion or addition of the resource, or start or termination of a use of the resource.

4. The communication terminal according to claim 1, wherein
the transmitter is further configured to send, to the publish-subscribe server, a pub request to publish the first status information or the second status information, and a sub request to subscribe to the first status information or the second status information.

5. The communication terminal according to claim 4, wherein
the transmitter is further configured to use a shared account to send the pub request and the sub request to the publish-subscribe server.

6. The communication terminal of claim 1, wherein the processing circuitry is further configured to determine whether the first application is using the resource, which is one of a camera, a microphone, and a pen tablet, and determine the second status based on the determination.

7. A communication system, comprising:
a publish-subscribe server; and
a communication terminal including
processing circuitry configured to output first status information indicating a first status related to presence of a first client communication application among a plurality of client communication applications according to call control information transmitted by the first communication application, and output second status information indicating a second status related to presence of a second client communication application among the plurality of client communication applications, the second status being determined according to whether the resource is being used by the first client communication application in the first status, and
a transmitter configured to send, for each of the plurality of client communication applications, a pub request to publish the call control information and a sub request to subscribe to the call control information to the publish-subscribe server
wherein the processing circuitry is further configured to execute an integrated client application that causes the processing circuitry to
manage a presence that indicates a status of each of the client communication applications, based on the information sent from each of the client communication applications;
request the publish-subscribe server to publish the presence of each client of the communication terminal; and
transmit a call control message sent by the client communication applications to the corresponding client communication applications of another communication terminal.

8. The communication system according to claim 7, further comprising
a relay control device configured to manage a relay of contents of data between the communication terminal and another communication terminal,
wherein the relay control device is further configured to send, to the publish-subscribe server, a sub request to subscribe to the call control information.

9. The communication system according to claim 7, wherein
the transmitter is further configured to send, to the publish-subscribe server, a sub request to publish the first status information or the second status information and a pub request to subscribe to the first status information or the second status information.

10. The communication system according to claim 7, further comprising
another communication terminal that is a counterpart communication terminal of the plurality of communication applications.

11. An output method, comprising:
outputting first status information indicating a first status related to presence of a first client communication application among a plurality of client communication applications according to a call control information transmitted by the first communication application;

outputting second status information indicating a second status related to presence of a second client communication application among the plurality of client communication applications, the second status being determined according to whether the resource is being used by the first client communication application in the first status;

sending for each of the plurality of client communication applications, a pub request to publish the call control information and a sub request to subscribe to the call control information to a publish-subscribe server;

managing a presence that indicates a status of each of the client communication applications, based on the information sent from each of the client communication applications;

requesting the publish-subscribe server to publish the presence of each client of the communication terminal; and transmitting a call control message sent by the client communication applications to the corresponding client communication applications of another communication terminal.

* * * * *